(12) United States Patent
Jeyabalan et al.

(10) Patent No.: US 11,009,098 B2
(45) Date of Patent: May 18, 2021

(54) BLADE AND SPRING DAMPER APPARATUS FOR USE WITH VEHICLE TORQUE CONVERTERS

(71) Applicant: Valeo Kapec CO., LTD., Dalseo-gu (KR)

(72) Inventors: Subramanian Jeyabalan, Auburn Hills, MI (US); Sungchul Lee, Dalseo-gu (KR); Vijayakumar Velayudham, Dalseo-gu (KR); Xuexian Yin, Dalseo-gu (KR)

(73) Assignee: Valeo Kapec CO., LTD., Dalseo-gu (KR)

( * ) Notice: Subject to any disclaimer, the term of this patent is extended or adjusted under 35 U.S.C. 154(b) by 14 days.

(21) Appl. No.: 16/514,388

(22) Filed: Jul. 17, 2019

(65) Prior Publication Data

US 2021/0018062 A1    Jan. 21, 2021

(51) Int. Cl.
*F16H 45/02* (2006.01)
*F16F 15/123* (2006.01)
*F16F 15/121* (2006.01)

(52) U.S. Cl.
CPC .... *F16F 15/12353* (2013.01); *F16F 15/1215* (2013.01); *F16H 45/02* (2013.01); *F16H 2045/0231* (2013.01)

(58) Field of Classification Search
CPC . F16F 15/12353; F16F 15/1215; F16H 45/02; F16H 2045/0231
See application file for complete search history.

(56) References Cited

U.S. PATENT DOCUMENTS

| 9,903,456 B1* | 2/2018 | Durham | F16H 45/02 |
| 2012/0080280 A1* | 4/2012 | Takikawa | F16H 45/02 |
| | | | 192/3.28 |

(Continued)

FOREIGN PATENT DOCUMENTS

| JP | 2016-003748 A | 1/2016 |
| JP | 2018-025298 A | 2/2018 |

OTHER PUBLICATIONS

PCT Search Report dated Oct. 15, 2020 in corresponding Korean application No. PCT/KR2020/009150 (3 pages).

(Continued)

*Primary Examiner* — David J Hlavka
(74) *Attorney, Agent, or Firm* — Oblon, McClelland, Maier & Neustadt, L.L.P.

(57) ABSTRACT

Blade and spring damper apparatus for use with vehicle torque converters are disclosed. A disclosed vehicle torque converter includes a housing, a hub, a clutch including a piston in the housing, and a damper assembly operatively interposed between the clutch and the hub. The damper assembly includes a blade damper having a blade and a roller engaging the blade. Movement of the roller relative to the blade bends and unbends the blade. The damper assembly also includes a spring damper connected to the blade damper. The spring damper includes a first spring damper portion, a second spring damper portion, and a spring between the first and second spring damper portions. Movement of the first spring damper portion relative to the second spring damper portion compresses and decompresses the spring. The blade damper and the spring damper, together, are configured to dampen a torsional vibration received by the housing when the clutch is engaged.

16 Claims, 15 Drawing Sheets

(56) References Cited

U.S. PATENT DOCUMENTS

| | | |
|---|---|---|
| 2015/0323041 A1 | 11/2015 | Takikawa et al. |
| 2017/0227101 A1 | 8/2017 | Depraete et al. |
| 2017/0268598 A1* | 9/2017 | Fenioux ............. F16F 15/1215 |
| 2017/0299015 A1 | 10/2017 | Hess et al. |
| 2017/0363194 A1* | 12/2017 | Durham .................. F16H 45/02 |
| 2018/0135738 A1* | 5/2018 | Yin ......................... F16H 45/02 |
| 2018/0209509 A1* | 7/2018 | Arhab ..................... F16H 45/02 |
| 2018/0283488 A1* | 10/2018 | Durham ................. F16H 45/02 |

OTHER PUBLICATIONS

PCT Written Opinion dated Oct. 15, 2020 in corresponding Korean application No. PCT/KR2020/009150 (7 pages).

* cited by examiner

US 11,009,098 B2

BLADE AND SPRING DAMPER APPARATUS FOR USE WITH VEHICLE TORQUE CONVERTERS

FIELD OF THE DISCLOSURE

This disclosure relates generally to vehicles and, more particularly, to blade and spring damper apparatus for use with vehicle torque converters.

BACKGROUND

Some motor vehicles having automatic transmission functionality employ fluid couplings such as torque converters that are interposed between an engine and a transmission to facilitate transferring torque from the engine to the transmission. These torque converters may include a torsional vibration damper (e.g., a tuned spring and mass) that is operatively coupled to a lockup clutch and configured to reduce torsional vibrations or sudden rotational movements generated by the engine when a torque converter lockup mechanism (e.g., a lockup clutch) is engaged. Such torsional vibration dampers increase part life for components of the transmission and/or other components of a vehicle driveline during lockup operation of a vehicle torque converter.

SUMMARY

An example vehicle torque converter includes a housing, a hub, a clutch including a piston in the housing, and a damper assembly operatively interposed between the clutch and the hub. The damper assembly includes a blade damper having a blade and a roller engaging the blade. Movement of the roller relative to the blade bends and unbends the blade. The damper assembly also includes a spring damper connected to the blade damper. The spring damper includes a first spring damper portion, a second spring damper portion, and a spring between the first and second spring damper portions. Movement of the first spring damper portion relative to the second spring damper portion compresses and decompresses the spring. The blade damper and the spring damper, together, are configured to dampen a torsional vibration received by the housing when the clutch is engaged The foregoing paragraph has been provided by way of general introduction and is not intended to limit the scope of the following claims.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

The figures are not to scale. In general, the same reference numbers will be used throughout the drawing(s) and accompanying written description to refer to the same or like parts.

DETAILED DESCRIPTION

Figure 1:
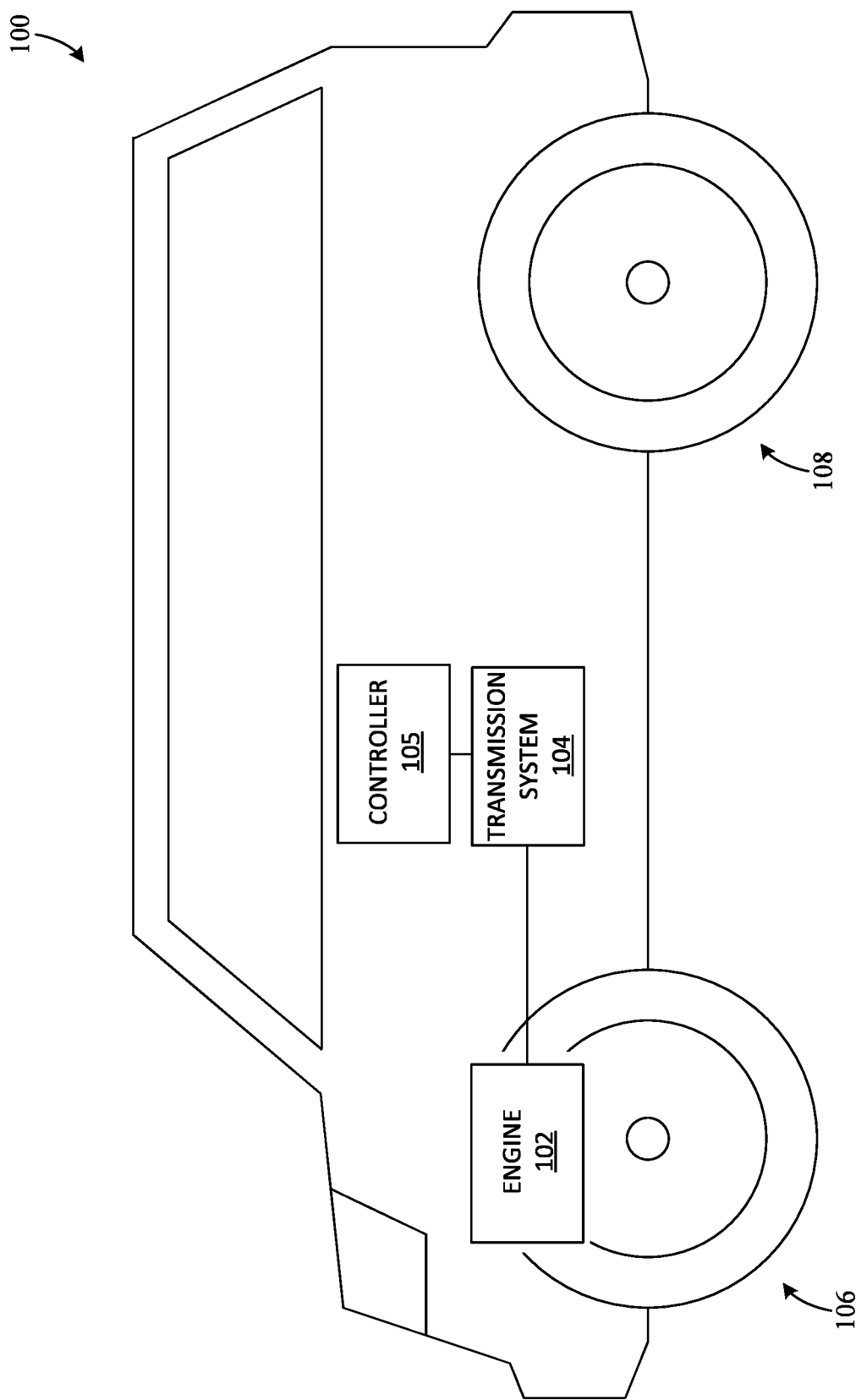
FIG. 1 is a schematic illustration of a vehicle in which examples disclosed herein can be implemented.

Some known vehicle torque converters include a known spring damper that is operatively coupled to a lockup clutch in a torque converter housing and configured to dampen harsh torsional vibrations generated by a vehicle engine when the lockup clutch is engaged. Alternatively, some other known vehicle torque converters include a known blade damper to similarly dampen such engine vibrations instead of the spring damper. However, such known blade dampers may only be effective for low engine torque applications, for example, when the vehicle engine is outputting a torque that is less than 250 newton meters (Nm). Further, because each of these known blade dampers operates by itself (i.e., without any other damper), these known blade dampers have blades that are relatively thick (e.g., a known blade thickness is 12 millimeters (mm) or more) to account for and/or reduce stress experienced by the blades. As a result, these known blade dampers are difficult and/or expensive to produce due to a related manufacturing process or technique (e.g. stamping).

These known blade dampers also typically include relatively large diameter bearings to sufficiently support rollers engaging respective ones of the blades. During blade damper operation, the blades impart substantially large radial loads on the bearings. Additionally, some known blade dampers include a stopper configured to limit rotational or angular deviation of the rollers relative to the blades. In such known blade dampers, a particular torque (i.e., a stopper torque), sufficient to stop relative rotation between the rollers and the blades, is unknown at different operating conditions and may vary. As such, these known blade dampers are difficult to properly design.

Blade and spring damper apparatus for use with vehicle torque converters are disclosed. Examples disclosed herein provide a torque converter for a vehicle and a damper assembly operatively coupled to the torque converter. The disclosed torque converter includes a housing (e.g., formed by a cover and an impeller), a hub (e.g., a turbine hub), and a clutch (e.g., a lockup clutch) having a piston in the housing. The disclosed damper assembly is operatively interposed between the clutch and the hub whereby torque is transmittable through the damper assembly from the piston to the hub. The piston is positioned adjacent a cover of the torque converter and configured to transfer a torque (e.g., an engine torque) from the cover to the damper assembly, for example, by engaging the cover. The disclosed damper assembly includes a blade damper and at least one spring damper that are operatively coupled or connected together (e.g., in series or parallel), which will be discussed in greater detail below in connection with FIGS. 1-19.

In particular, the disclosed blade damper and the disclosed spring damper, together, are configured dampen torsional vibration(s) received by the housing when the clutch is at least partially engaged. In this manner, when implemented in the vehicle, disclosed examples provide an adjusted or regulated engine torque to the hub having substantially reduced or eliminated torsional vibration(s), which prevents a transmission system or driveline component(s) of the vehicle from receiving damage that would have otherwise been caused by raw engine torque. More particularly, as a result of combining the blade damper and the spring damper together, the disclosed damper assembly is effective during high torque applications, for example, when the engine torque is equal to or greater than 250 Nm. Additionally, in some examples, a disclosed blade is sized and/or shaped to have a thickness that is relatively small (e.g., less than 12 mm) while maintaining performance of the damper assembly, which would have otherwise been unattainable using the above-mentioned known torque converters or known dampers. Accordingly, disclosed examples facilitate manufacturing processes associated with the blade and/or reduce costs typically associated therewith. Alternatively, the disclosed damper assembly is implemented differently in the vehicle. For example, the damper assembly could instead be operatively coupled to a flywheel (e.g., a dual mass flywheel) to similarly dampen the torsional vibration(s) generated by a vehicle engine.

The disclosed blade damper includes at least one blade and at least one roller engaging the blade. The blade damper also includes an input blade damper portion (e.g., a rotatable body such as a plate) supporting the roller and an output blade damper portion (e.g., a rotatable body such as the hub or a plate) supporting the blade whereby the input blade damper portion is rotatable relative to the output blade damper portion. In particular, the blade damper is configured to generate a damping effect (e.g., a damping torque) when the roller bends, unbends, and/or otherwise changes a state of the blade. Additionally, the disclosed spring damper includes an input spring damper portion (e.g., a rotatable body such as a plate), an output spring damper portion (e.g., a rotatable body such as a plate), and at least one spring (e.g., a coil spring) operatively interposed between the input spring damper portion and the output spring damper portion. In particular, the spring damper is configured to generate a damping effect (e.g., a damping torque) when the input and output spring damper portions compress, decompress, and/or otherwise change a state of the spring.

In some examples, the blade damper and the spring damper are connected together in a parallel configuration such that the damper assembly splits the engine torque and/or distributes the engine torque to the blade damper and the spring damper before the hub receives the engine torque. Alternatively, in some examples, the blade damper and the spring damper are connected together in a series configuration such that the damper assembly does not split the engine torque. Instead, in such examples, the damper assembly is structured and/or configured transmit the engine torque successively through (a) one of the blade or spring damper and (b) the other one of the blade or spring damper.

FIG. 1 is a schematic illustration of a vehicle (e.g., a car, a truck, a sport utility vehicle (SUV), etc.) 100 in which examples disclosed herein can be implemented. According to the illustrated example of FIG. 1, the vehicle 100 includes an engine (e.g., an internal combustion engine) 102, a transmission system 104, a controller 105, and one or more wheels 106, 108 (sometimes referred to as road wheels), two of which are shown in this example, (i.e., a first or front wheel 106 and a second or rear wheel 108).

The transmission system 104 of FIG. 1 can be implemented, for example, using an automatic transmission system. In particular, the transmission system 104 of FIG. 1 is structured and/or configured to transfer torque from the engine 102 to the wheel(s) 106, 108 to move the vehicle 100. For example, the engine 102 generates a torque (sometimes referred to as an engine torque) and, in response, the transmission system 104 controls an amount or degree of the engine torque that is provided to the wheel(s) 106, 108. In some examples, the transmission system 104 includes an actuator system that is operable by the controller 105 such as, for example, a hydraulic actuator system including a valve (e.g., a solenoid valve).

The controller 105 of FIG. 1 can be implemented, for example, using an electronic control unit (ECU) such as a transmission control module (TCM). In particular, the controller 105 is configured to change a state of a torque converter clutch (e.g., a lockup clutch) based on a detected condition of the vehicle 100. For example, the vehicle controller 105 is communicatively coupled to the valve associated with the transmission system 104, for example, via a transmission or signal wire, a bus (e.g., a controller area network (CAN)), radio frequency, etc.

Figure 2:
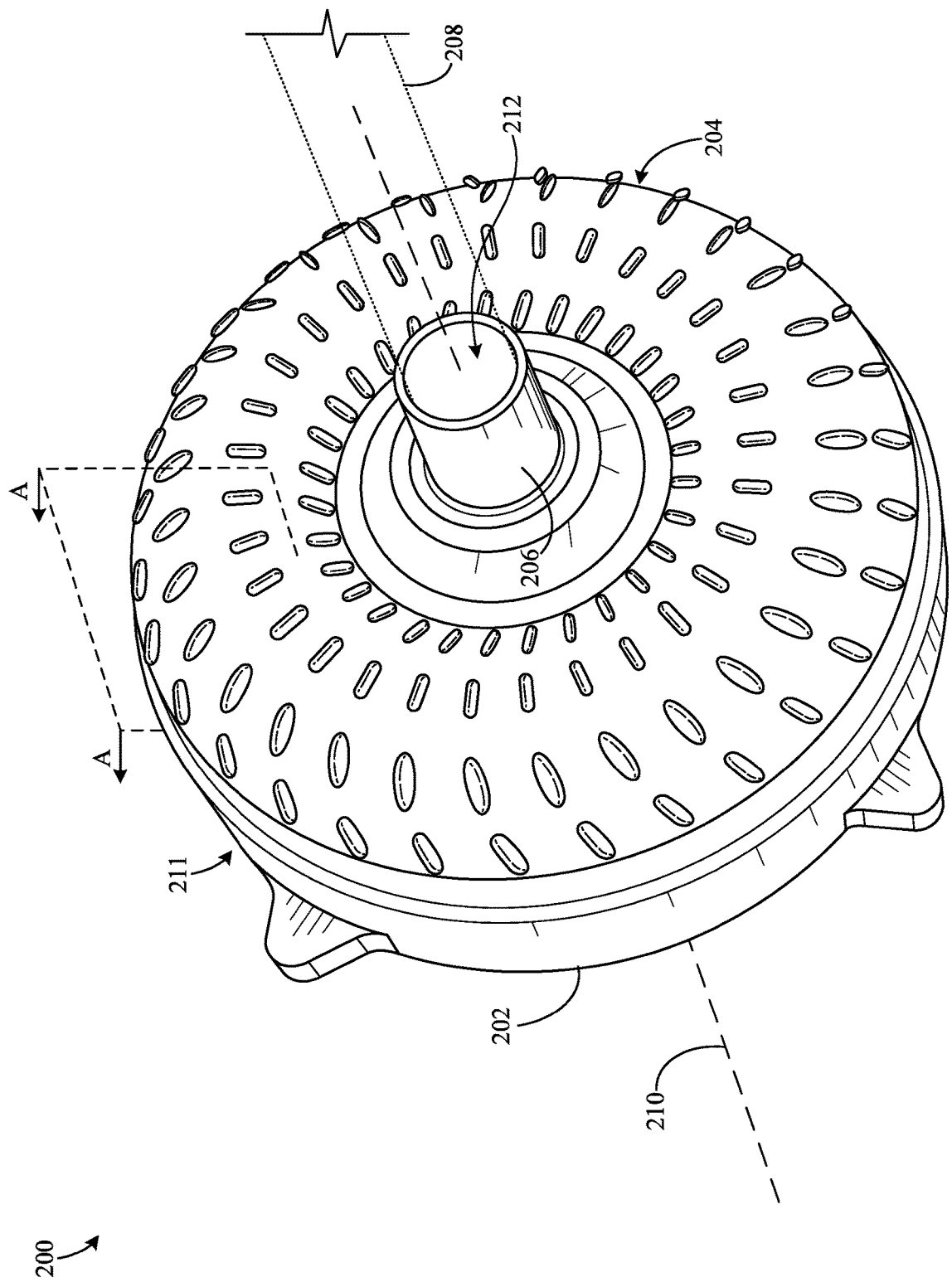
FIG. 2 is a view of a vehicle torque converter in which examples disclosed herein can be implemented.

FIG. 2 is a view of an example vehicle torque converter 200 in which examples disclosed herein can be implemented. According to the illustrated example of FIG. 2, the torque converter 200 includes a cover 202, an impeller 204, and a first hub (e.g. a drive hub) 206. In some examples, the torque converter 200 of FIG. 2 is implemented in the vehicle 100 to facilitate transferring torque between the engine 102 and the transmission system 104. In other words, the vehicle 100 of FIG. 1 includes the torque converter 200. In such examples, the torque converter 200 of FIG. 2 is operatively couple between the engine 102 and the transmission system 104 of the vehicle 100.

The torque converter 200 of FIG. 2 is changeable between a first example operating mode (e.g., an unlocked operating mode) that is associated with a first operating characteristic of the torque converter 200 and a second example operating mode (e.g., a locked-up or locked operating mode) that is associated with a second operating characteristic of the torque converter 200 different relative to the first operating characteristic. When the torque converter 200 is in the first operating mode thereof, the torque converter 200 allows for substantial rotational or angular deviation between the engine 102 and a first shaft (e.g., a transmission input shaft or a torque converter output shaft) 208, for example, such that a rotational speed of the first shaft 208 is different relative to a rotational speed of a crankshaft of the engine 102. As a result, the engine 102 can remain in operation (i.e., the crankshaft remains rotating) when the vehicle 100 is stopped (i.e., the first shaft 208 is not rotating) without causing the engine 102 to stall or adversely affecting the engine 102 in another manner. Further, in such examples, the torque converter 200 increases or multiplies the engine torque provided to the transmission system 104 and/or the wheel(s) 106, 108 when the vehicle 100 drives at certain speeds (e.g., relatively low speeds).

In particular, the torque converter 200 is configured to substantially prevent rotational or angular deviation of the cover 202 relative to the first shaft 208 when the torque converter 200 is in the second operating mode thereof, for example, via the first clutch 303 discussed below. In such examples, the first clutch 303, when engaged, directly connects the first shaft 208 to the engine 102. As a result, the torque converter 200 reduces or eliminates engine power loss during certain driving conditions (e.g., when the vehicle 100 is traveling at relatively high speeds). Additionally, the torque converter 200 is configured to dampen torsional vibration(s) generated by the engine 102 when the torque converter 200 is in the second operating mode thereof, for example, via the damper assembly 300 discussed below.

The cover 202 of FIG. 2 is relatively non-rotatably (i.e., fixedly) coupled to a component (e.g., the crankshaft or a flywheel) associated with the engine 102 to receive the engine torque or output from the engine 102, for example, via one or more example fasteners and/or one or more example fastening methods or techniques. That is, the component associated with the engine 102 supports one or more (e.g., all) of the cover 202, the impeller 204, and/or, more generally, the torque converter 200 when the cover 202 and the component are assembled. In some examples, the torque converter 200 includes a flywheel that is interposed between the cover 202 and the crankshaft. Additionally, the cover 202 is relatively non-rotatably (i.e., fixedly) coupled to the impeller 204 to drive the impeller 204 via the engine torque, for example, via one or more example fasteners and/or one or more example fastening methods or techniques (e.g., welding). That is, the cover 202 and the impeller 204 rotate together relative to a first axis (e.g., an axis of rotation) 210 associated with the torque converter 200 in the same direction (e.g., clockwise or counterclockwise) associated with the torque converter 200. Further, as shown in FIG. 2, the cover 202 and the impeller 204 form and/or define a housing 211 of the torque converter 200 in which one or more torque converter components are positioned.

The impeller 204 of FIG. 2 is structured and/or configured to control a parameter (e.g., a flow rate) of a fluid in the torque converter when the impeller 204 rotates relative to the first axis 210, for example, via one or more fins, one or more blades, one or more vanes, and/or any other suitable fluid flow control member positioned on the impeller 204. Additionally, the impeller 204 is relatively non-rotatably (i.e., fixedly) coupled to the cover 202 to receive the engine torque therefrom, as previously mentioned. In particular, in response to the impeller 204 rotating relative to the first axis 210 when the torque converter 200 is in the first operating mode thereof, the torque converter 200 generates an output or a torque (sometimes referred to as an output torque) for the transmission system 104, a magnitude of which is based on, for example, any of the engine torque, a speed of the vehicle, torus parameters, parameters of the fluid flow control members, fluid parameters, fluid properties, etc.

The first hub 206 of FIG. 2 is connected to a portion of the transmission system 104 that is associated with pumping a fluid for the torque converter 200. In particular, rotation of the first hub 206 relative to the first axis 210 changes a parameter (e.g., a fluid pressure, a flow rate, etc.) of the fluid in one of the transmission system 104, the first shaft 208, the housing 211, or any combination thereof. Additionally, the first hub 206 of FIG. 2 is configured to removably receive the first shaft 208 associated with the vehicle transmission system 104 via an aperture 212 formed by the first hub 206. As shown in FIG. 2, the first shaft 208 extends at least partially into the housing 211 through the aperture 212.

The first shaft 208 of FIG. 2 is operatively interposed between the torque converter 200 and a portion (e.g., a gear box) of the transmission system 104 to transfer the output torque from the torque converter 200 to the transmission system 104, thereby driving the wheel(s) 106, 108. In some examples, the first shaft 208 is inserted into the first hub 206, thereby connecting the first shaft 208 to an output portion of the torque converter 200 such as, for example, the second hub 304 discussed below. In such examples, the first shaft 208 and the output portion are relatively non-rotatably (i.e., fixedly) coupled together, for example, via a splined connection.

Figure 3:
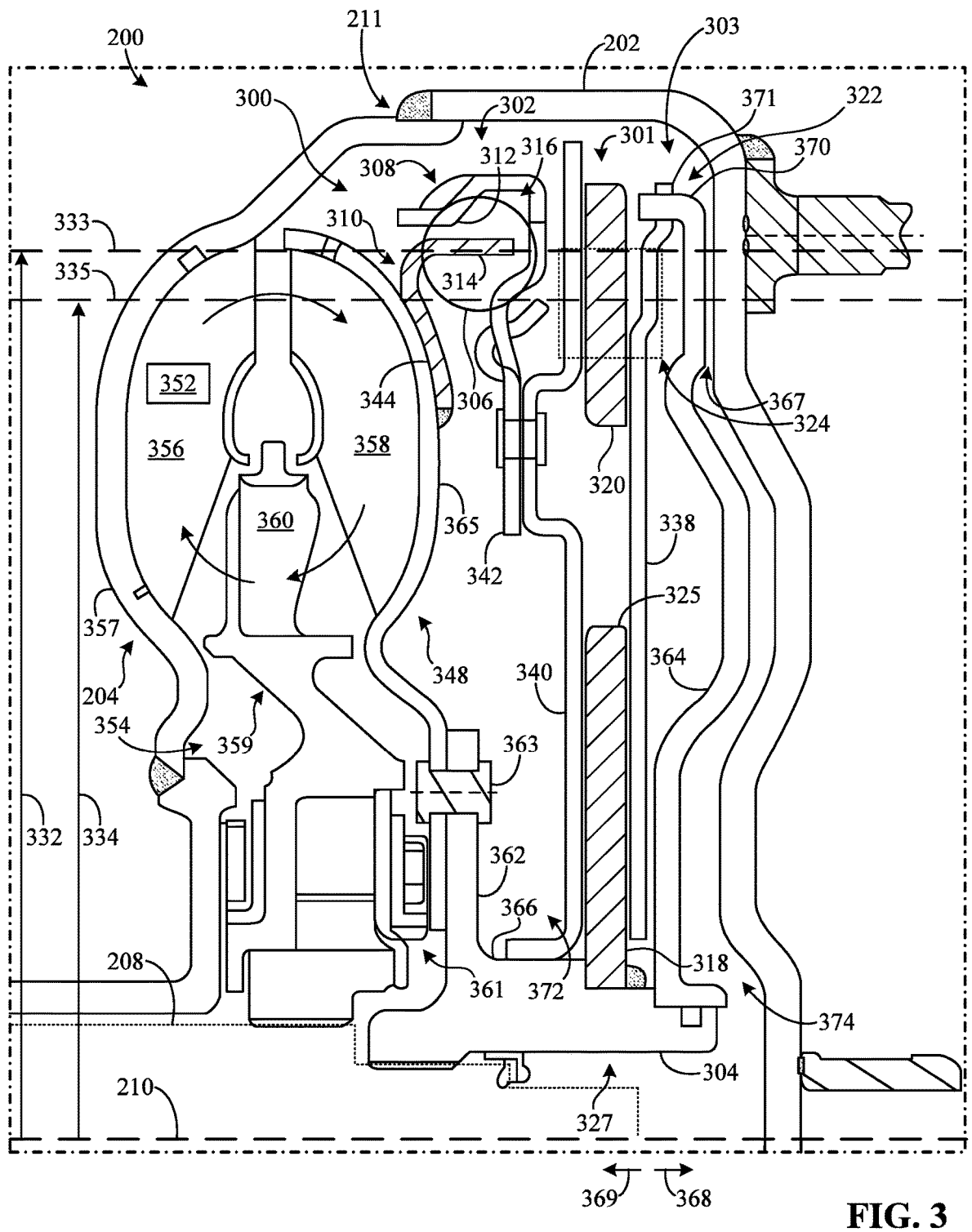
FIG. 3 is a partial cross-sectional view of the vehicle torque converter of FIG. 2 along line A-A and shows an example damper assembly therein in accordance with the teachings of this disclosure.

FIG. 3 is a partial cross-sectional view of the torque converter 200 of FIG. 2 along line A-A and shows an example damper assembly 300 therein in accordance with the teachings of this disclosure. According to the illustrated example of FIG. 3, the damper assembly 300 includes a blade damper 301 and a primary or first spring damper 302 that are positioned in the torque converter housing 211. The blade damper 301 of FIG. 3 and the first spring damper 302 of FIG. 3 are operatively interposed between a first clutch (e.g., a lockup clutch) 303 of the torque converter 200 and a second hub (e.g., a turbine hub) 304 of the torque converter 200. In other words, the damper assembly 300 of FIG. 3 is operatively interposed between the first clutch 303 and the second hub 304. Accordingly, a torque, such as the engine torque, is transmittable (e.g., simultaneously or successively) through the first spring damper 302 and the blade damper 301 from the first clutch 303 to the second hub 304. The blade damper and the first spring damper 302, together, are configured to dampen a torsional vibration (e.g., generated by the engine 102) received by the housing 211 when the first clutch 303 is engaged, which is discussed further below in connection with FIGS. 4-19. As a result, disclosed examples prevent the transmission system 104 and/or any other drivetrain or driveline component of the vehicle 100 from wearing, degrading, and/or otherwise receiving damage that would have otherwise been caused by an undamped vibration. In particular, the blade damper 301 is connected to at least a portion of the first spring damper 302, for example, such that the spring damper 302 and the blade damper 301 form a parallel connection or a series connection between the first clutch 303 and the second hub 304. As such, a flow of the engine torque through the damper assembly 300 is based on, for example, couplings or connections associated with the blade damper 301, the first spring damper 302, the first clutch 303, and the second hub 304.

The first spring damper 302 of FIG. 3 includes a first spring (e.g., a coil spring) 306 operatively coupled thereto. The first spring 306 is configured to generate a first damping torque for the torque converter 200 when the first spring 306 compresses, decompresses, and/or otherwise changes between a first state (e.g., a substantially uncompressed state) thereof and a second state (e.g., a substantially compressed state) thereof. Additionally, to facilitate controlling the state of the first spring 306, the first spring damper 302 also includes an input or first spring damper portion (e.g., at least one annular body such as a plate) 308 and an output or second spring damper portion (e.g., at least one annular body such as a plate) 310. Each of the first and second spring damper portions 308, 310 is supported by a support structure of the torque converter 200 such as, for example, the second hub 304, a turbine shell, etc. In particular, the first and second spring damper portions 308, 310 of the first spring damper 302 are moveable relative to each other, thereby changing the state of the first spring 306. That is, movement of the first spring damper portion 308 relative to the second spring damper portion 310 compresses and/or decompresses the first spring 306. As a result of such relative movement, the first spring 306 generates the first damping torque and applies the first damping torque to the second spring damper portion 310. In this manner, the first spring damper 302 dampens the torsional vibration(s) when at least a portion of the engine torque is transmitted through the first spring damper 302.

In some examples, to facilitate spring compression and decompression, the spring damper includes one more seats (e.g., spring seats) 312, 314, two of which are shown in this example (sometimes referred to as a first pair of seats). As shown in FIG. 3, the first seat 312 is positioned on and/or formed by the first spring damper portion 308. Further, the first seat 312 is abutting or configured to abut a first end of the first spring 306. Additionally, the second seat 314 of FIG. 3 is positioned on and/or formed by the second spring damper portion 310. Further, the second seat 314 of FIG. 3 is abutting or configured to abut a second end of the first spring 306 opposite the first end. In such examples, the first spring 306 compresses when first and second seats 312, 314 move toward each other. That is, the first spring 306 changes from the first state thereof to the second state thereof in response to such relative movement associated with the seats 312, 314. On the other hand, the first spring 306 decompresses when the first and second seats 312, 314 move away from each.

In some examples, to facilitate carrying the first spring 306, the first spring damper 302 includes a first spring cavity (e.g., a spring cavity and/or an annular shaped cavity) 316 that is formed by the first spring damper portion 308 and/or the second spring damper portion 310. In such examples, the first spring 306 is positioned in the first spring cavity 316. As shown in FIG. 3, the first spring 306 extends through the first spring cavity 316 between the first and second seats 312, 314.

Although FIG. 3 depicts a single spring 306, in some examples, the first spring damper 302 is implemented differently. In some such examples, the first spring damper 302 includes one or more other springs (e.g., coil spring(s)) in addition or alternatively to the first spring 306, each of which is associated with a pair of spring seats formed by the first and second portions 308, 310. Further, although FIG. 3 depicts aspects in connection with the single spring 306, in some examples, such aspects likewise apply to the other spring(s). In such examples, the first spring 306 and the other spring(s) are radially distributed relative to the first axis 210. Further, in some such examples, the first spring damper 302 also includes one or more other spring cavities in addition or alternatively to the first spring cavity 316, each of which contains a respective one of the other spring(s). In such examples, the first spring cavity 316 and the one or more other spring cavities are radially distributed relative to the first axis 210. In some other examples, the first spring damper 302 includes spring sets connected to each other, for example, in series or in parallel. In series-connected examples, the first spring damper 302 may include an additional plate (e.g., an intermediate plate or a phase washer). The spring sets may be radially or circumferentially distributed relative to the first axis 210.

The blade damper 301 of FIG. 3 includes a first blade 318 operatively coupled thereto. The first blade 318 is configured to generate a second damping torque for the torque converter 200, separate from the first damping torque, when the blade 318 flexes, bends, unbends, and/or otherwise changes between a first state (e.g., a substantially unbent state) thereof and a second state (e.g., a substantially bent state) thereof. Additionally, to facilitate controlling the state of the first blade 318, the blade damper 301 also includes a first roller 320 engaging the first blade 318. The first blade 318 and the first roller 320 are moveable relative to each other. In particular, movement of the first roller 320 relative to the first blade 318 bends and/or unbends the first blade 318. Such relative movement associated with the first blade 318 and the first roller 320 changes the state of the first blade 318, which is discussed further below in connection with FIG. 12. In this manner, the blade damper 301 dampens the torsional vibration(s) when at least a portion of the engine torque is transmitted through blade damper 301.

To facilitate supporting the first roller 320 (and/or one or more other rollers), the blade damper 301 of FIG. 3 also includes an input or first blade damper portion (e.g., at least one annular body such as a plate) 322 and a first bearing (e.g., a ball bearing) 324 positioned on the first blade damper portion 322. The first bearing 324 of FIG. 3 is operatively coupled to the first blade damper portion 322 and the first roller 320 such that the first roller 320 is rotatable relative to the first blade damper portion 322, which allows the first roller 320 to roll at least partially across an outer surface 325 of the first blade 318. That is, the first bearing 324 of FIG. 3 relatively rotatably couples the first roller 320 to the first blade damper portion 322 of the blade damper 301. As such, the first blade damper portion 322 is sized, shaped, structured, and/or otherwise configured to carry the first roller 320 via the first bearing 324.

Additionally, to facilitate supporting the first blade 318 (and/or one or more other blades), the blade damper 301 includes an output or second blade damper portion (e.g., at least one annular body such as a plate) 327. The second blade damper portion 327 of FIG. 3 is rotatable relative to the first blade damper portion 322. According to one or more disclosed examples, the second hub 304 corresponds to or is otherwise used to implement the second blade damper portion 327. Alternatively, a different component (e.g., the third plate 342) corresponds to and/or is otherwise used to implement the second blade damper portion 327, as discussed further below in connection with FIGS. 8 and 9. In particular, the second blade damper portion 327 of FIG. 3 is connected to the first blade 318 to receive the second damping torque from the first blade 318.

According to the illustrated example of FIG. 3, the first spring damper portion 308 is configured to receive the engine torque, for example, from one of (a) a portion of the clutch 303 (b) the first blade damper portion 322, (c) the second blade damper portion 327, or (d) any combination thereof. For example, the first spring damper portion 308 of FIG. 3 is connected to first blade damper portion 322 to the receive the engine torque from the first blade damper portion 322 when the first clutch 303 is at least partially engaged. Further, the second spring damper portion 310 of FIG. 3 is connected to the second hub 304 to drive the first shaft 208, for example, via a torque converter turbine 348 interposed between the second spring damper portion 310 and the second hub 304.

Similarly, according to the illustrated example of FIG. 3, the first blade damper portion 322 is configured to receive the engine torque, for example, from one of (a) a portion of the first clutch 303, (b) the first spring damper portion 308, (c) the second spring damper portion 310, or (d) any combination thereof. For example, the second blade damper portion 327 of FIG. 3 is connected to a portion of the first clutch 303 to receive the engine torque from the first clutch 303 when the first clutch 303 is at least partially engaged. Further, the second blade damper portion 327 of FIG. 3 is connected to the second hub 304 to drive the first shaft 208. However, in some examples, the second blade damper portion 327 is connected to the first spring damper portion 308.

Figure 12:
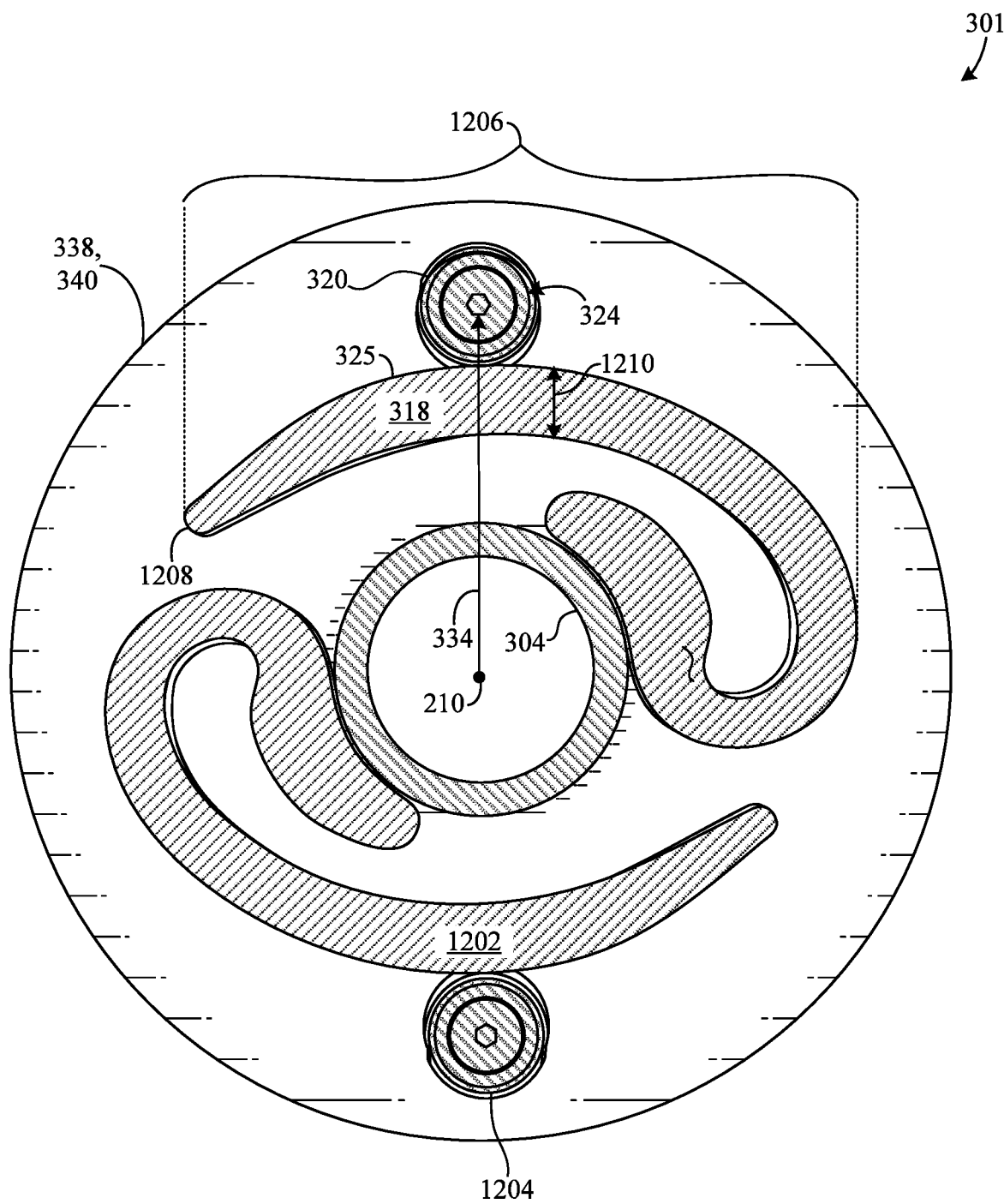
FIG. 12 is a view of an example blade damper and shows an example configuration thereof in accordance with the teachings of this disclosure.

Although FIG. 3 depicts a single blade 318 and a single roller 320, in some examples, the blade damper 301 is implemented differently (e.g., see FIG. 12). In some such examples, the blade damper 301 includes one or more other blades in addition or alternatively to the first blade 318. Accordingly, although FIG. 3 depicts aspects in connection with the single blade 318, in some examples, such aspects likewise apply to the other blade(s). In such examples, the first blade 318 and the other blade(s) are radially distributed relative to the first axis 210. Further, in some such examples, the blade damper 301 includes one or more other rollers in addition or alternatively to the first roller 320, each of which engages a respective one of the other roller(s). Accordingly, although FIG. 3 depicts aspects in connection with the single blade 318, in some examples, such aspects likewise apply to the other blade(s).

According to the illustrated example of FIG. 3, the first spring 306 is positioned substantially at a first radius 332 relative to the first axis 210. As such, during operation of the torque converter 200, the first spring 306 travels along a substantially circular path corresponding to a first pitch circle diameter (PCD) 333 associated with the first spring 306. Further, the first roller 320 is positioned substantially at a second radius 334 relative to the first axis 210. As such, during operation of the torque converter 200, the first roller 320 travels along a substantially circular path corresponding to a second PCD 335, similar to the first spring 306. In some examples, the first radius 332 is less than or greater than (as shown in FIG. 3) the second radius 334. Accordingly, in such examples, the first PCD 333 is less than or greater than (as shown in FIG. 3) the second PCD 335. As shown in FIG. 3, the first PCD 333 and the second PCD 335 are substantially concentric relative to the each other whereby the first axis 210 extends through a center of the first PCD 333 and a center of the second PCD 335. However, in some examples, the first spring 306 and/or the first roller 320 is/are positioned differently, which is discussed in greater detail below in connection with FIG. 5. In some such examples, the first radius 332 is substantially equal to or the same as the second radius 334, and the first PCD 333 is substantially equal to or the same as the second PCD 335.

In some examples, the first PCD 333 and the second PCD 335 form and/or define a ratio (e.g., a PCD ratio), which is represented by equation one (1) below:

$$PCD \text{ ratio} = \frac{PCD_{spring}}{PCD_{roller}} \quad (1)$$

In equation one (1) above, $PCD_{spring}$ represents a value corresponding to the first PCD 333, and $PCD_{roller}$ represents a value corresponding to the second PCD 335. In particular, in such examples, the first spring 306 and the first roller 320 are positioned in the torque converter housing 211 such that the ratio is between about 0.6 and about 2. Beyond this ratio limitation, dampening filtration of the first spring damper 302 may be degraded, and proper torque converter packaging may be difficult to achieve.

In some examples, to implement any one or more (e.g., all) of the damper portions 308, 310, 322, 327, the damper assembly 300 of FIG. 3 also includes one or more plates 338, 340, 342, 344 (e.g., assembled or connected together), four of which are shown in this example (i.e., a first plate 338, a second plate 340, a third plate 342, and a fourth plate 344). According to the illustrated example of FIG. 3, the first plate 338 and the second plate 340 of FIG. 3 correspond to and/or are used to implement the first blade damper portion 322. As such, the first plate 338 and the second plate 340, together, support the first roller 320 via the bearing 324. The first plate 338 of FIG. 3 is sometimes referred to as a side plate or a first side plate. Also, the second plate 340 of FIG. 3 is sometimes referred to as a side plate or a second side plate. Further, the third plate 342 of FIG. 3 corresponds to and/or is used to implement the first spring damper portion 308. The third plate 342 is sometimes referred to as an intermediate plate. Further still, the fourth plate 344 of FIG. 3 corresponds to and/or is used to implement the second spring damper portion 310. On the other hand, in some examples, at least one component of the torque converter 200 is used to implement the damper portion(s) 308, 310, 322, 327 such as, for example, the second hub 304 and/or a clutch piston.

According to the illustrated example of FIG. 3, the torque converter 200 also includes the damper assembly 300, the first clutch 303, the turbine 348, and a fluid (e.g., torque fluid) 352, each of which is disposed in a cavity (e.g., a substantially sealed cavity) 354 formed by the torque converter housing 211. In particular, the turbine 348 of FIG. 3 is configured to receive the fluid 352 from the impeller 204 during engine operation when the first clutch 303 is disengaged, thereby generating the torque for the second hub 304. For example, the impeller 204 includes one or more fluid flow control members (e.g., fins, blades, vanes) 356 and a housing or first shell (e.g., an impeller shell) 357 on which the fluid flow control member(s) 356 are positioned. The fluid flow control members 356 of the impeller 204 are radially distributed relative to the first axis 210 and extend radially outward relative to the first axis 210. Similarly, the turbine 348 of FIG. 3 includes one or more fluid flow control members (e.g., fins, blades, vanes, etc.) 358 and a housing or second shell (e.g., a turbine shell) 365 on which the fluid flow control member(s) 358 are positioned. The fluid flow control members 358 of the turbine 348 are radially distributed relative to the first axis 210 and extend radially outward relative to the first axis 210. As the fluid flow control members 356 of the impeller 204 rotate together with the cover 202 relative to the first axis 210, the fluid 352 is urged and/or pumped radially outward relative to the first axis 210 toward the fluid flow control members 358 of the turbine 348. That is, the fluid flow control members 356 of the impeller 204 direct a flow of the fluid 352 onto the fluid flow control members 358 of the turbine 348 such that the fluid 352 imparts fluid force(s) on the fluid flow control members 358 of the turbine 348. The turbine 348 of FIG. 3 generates the torque or output of the torque converter 200 as a result of such fluid interaction, a degree of which is based on one or more parameters associated with the torque converter 200 such as, for example, one or more of a rotational speed of the impeller 204, a rotational speed of the turbine 348, angles of the respective fluid flow control members 356, 358, lengths of the respective fluid flow control members 356, 358, properties (e.g., viscosity) of the fluid 352, etc.

In some examples, to increase the torque generated by the turbine 348 and/or improve torque converter efficiency, the torque converter 200 also includes a stator 359 operatively interposed between the impeller 204 and the turbine 348. The stator 359 of FIG. 3 is relatively rotatably coupled to the housing 211, for example, via a second bearing (e.g., a thrust bearing) operatively interposed between the stator 359 and a portion (e.g., the impeller 204) of the housing 211. In particular, the stator 359 of FIG. 3 includes one or more fluid flow control members (e.g., fins, blades, vanes, etc.) 360 positioned thereon. The fluid flow control members 360 of the stator 359 are radially distributed relative to the first axis 210 and extend radially outward relative to the first axis 210. More particularly, the fluid flow control members 360 of the stator 359 are configured to change a flow direction of the fluid 352 when the fluid 352 is traveling from the turbine 348 to the impeller 204, which increases efficiency of the impeller 204 in pumping the fluid 352 and/or, more generally, increases efficiency of the torque converter 200 by advantageously utilizing an inertia of the fluid 352.

For example, as the turbine 348 rotates, the fluid flow control members 358 of the turbine 348 direct the fluid 352 onto the fluid flow control members 360 of the stator 359 in a first direction and, in response, the fluid flow control members 360 of the stator 359 direct the fluid 352 onto the fluid flow control members 356 of the impeller 204 in a second direction different from the first direction. Such control of the fluid 352 may cause the stator 359 to rotate relative to the first axis 210 (e.g., at relatively high speeds of the vehicle 100). Additionally, to account for this stator rotation, the torque converter 200 also includes a second clutch (e.g., a one-way clutch) 361 operatively coupled to the stator 359 and interposed between the impeller 204 and the turbine 348. In particular, the second clutch 361 is configured to prevent the stator 359 from rotating relative to the first axis 210 in a single direction (e.g., clockwise or counterclockwise).

The second hub 304 of FIG. 3 is sized, shaped, structured, and/or otherwise configured to receive the first shaft 208 and provide the torque generated by the turbine 348 to the first shaft 208. The second hub 304 is relatively rotatably coupled to the stator 359 and, consequently, the housing 211, for example, via a third bearing (e.g., a thrust bearing) operatively interposed between the second hub 304 and (a) a portion of the second hub 304 and/or (b) a portion of the turbine 348. Also, the second hub 304 is non-relatively rotatably (i.e., fixedly) coupled to the second shell 365 of the turbine 348. As such, the turbine 348 and the second hub 304, together, are rotatable relative to the housing 211 when the first clutch 303 is disengaged.

In some examples, the second hub 304 defines an inner surface (e.g., an inner circumferential surface) having grooves that are positioned thereon, and the first shaft 208 defines an outer surface (e.g., an outer circumferential surface) having splines that are positioned thereon. In such examples, the grooves of the second hub 304 receive the splines of the first shaft 208, thereby non-relatively rotatably (i.e., fixedly) coupling the second hub 304 to the first shaft 208. In other words, the second hub 304 and the first shaft 208 of FIG. 2 are splined together such that the first shaft 208 and the second hub 304 rotate together relative to the first axis 210 in the same direction.

In some examples, to facilitate supporting the turbine 348 and/or coupling the turbine 348 and the second hub 304 together, the second hub 304 of FIG. 3 defines a first flange 362 extending away from the second hub 304 radially outward relative to the first axis 210. In such examples, the second shell 365 is positioned on the first flange 362 and relatively non-rotatably (i.e., fixedly) coupled the first flange 362, for example, via one or more fasteners and/or one or more fastening methods or techniques (e.g., welding). For example, the damper assembly 300 includes one or more fasteners (e.g., bolt(s), stud(s), rivet(s), etc.) 363 coupling turbine 348 to the first flange 362, which may be radially distributed relative to the first axis 210. As shown in FIG. 3, the fastener(s) 636 extend through a portion of the second shell 365 and a portion of the first flange 362.

The first clutch 303 of FIG. 3 is changeable between a first state (e.g., a disengaged state) thereof and a second state (e.g., a fully engaged state or a partially engaged state) thereof, for example, via the actuator system of the transmission system 104. The first state of the first clutch 303 corresponds to the first operating mode of the torque converter 200. That is, the first clutch 303 provides the first operating mode of the torque converter 200 when the first clutch 303 is in the first state thereof. Further, the second state of the first clutch 303 corresponds to the second operating mode of the torque converter 200. That is the first clutch 303 provides the second operating mode of the torque converter 200 when the first clutch 303 is in the second state thereof.

To facilitate connecting the housing 211 and the second hub 304 together during certain operating conditions, the first clutch 303 of FIG. 3 includes a piston 364 in the housing 211. The piston 364 of FIG. 3 can be implemented, for example, using an annular body such as a plate. As shown in FIG. 3, the piston 364 is positioned on or proximate to an outer surface (e.g., an outer circumferential surface that is relatively smooth) 366 of the second hub 304 and adjacent the cover 202. To provide the second state of the first clutch 303, the piston 364 of FIG. 3 is configured to engage the cover 202 to generate friction at an engagement interface 367 defined by the piston 364 and the cover 202. For example, the piston 364 of FIG. 3 is slidable along and/or relative to the outer surface 366 in a first direction 368 toward the cover 202 whereby annular surfaces associated with the respective piston 364 and the cover 202 impart substantially large forces on each other. Such frictional engagement of the piston 364 and the cover 202 provides a connection between the cover 202 and the piston 364 and, consequently, the second state of the first clutch 303. As a result, the piston 364 transfers the engine torque from the cover 202 to a portion of the damper assembly 300 such as, for example, the first spring damper portion 308 and/or the first blade damper portion 322. Conversely, to provide the first state of the first clutch 303, the piston 364 is configured to disengage and/or separate from the cover 202. For example, the piston 364 of FIG. 3 is slidable along and/or relative to the outer surface 366 in a second direction 369, opposite the first direction 368, whereby the annular surfaces disengage or separate from each other. Such disengagement of the piston 364 and the cover 202 provides the first state of the first clutch 303. As a result, the piston 364 ceases the transmission of the engine torque through the damper assembly 300.

Additionally, in some examples, the piston 364 includes one or more connecting portions (e.g., tab(s) and/or protrusion(s)) 370 positioned thereon at or proximate to an outer radius of the piston 364. The connecting portions 370 of the piston 364 extend radially outward relative to the first axis 210 and/or curve away from the piston 364 toward the first plate 338 to receive the first plate 338. The connecting portion(s) 370 of the piston 364 may be radially distributed relative to the first axis 210. Similarly, in such examples, the first plate 338 of FIG. 3 also includes one or more connecting portions (e.g., tab(s) and/or protrusion(s)) 371 positioned thereon at or proximate to an outer radius of the first plate 338. The connecting portion(s) 371 of the first plate 338 extend radially outward relative to the first axis 210 and/or curve away from first plate 338 toward the connecting portion(s) 370 of the piston 364 to receive the connecting portion(s) 370. In particular, the connecting portion(s) 370 of the piston 364 are configured to engage respective ones of the connecting portion(s) 371 of the first plate 338. As such, rotational movement of the piston 364 results in rotational movement of the first plate 338.

In some examples, to facilitate control of the piston 364 via the fluid 352, the torque converter 200 includes a first chamber (e.g., a hydraulic fluid chamber) 372 and a second chamber 374 fluidly coupled (e.g., via a space between the piston 364 and the cover 202) to the first chamber 372. Each of the chambers 372, 374 of FIG. 3 is formed by the piston 364 and the housing 211. As such, the first chamber 372 is positioned on a first side of the piston 364, and the second chamber 374 is positioned on a second side of the piston 364 opposite the first side. Further, the first chamber 372 is also partially formed by the second hub 304. In particular, the fluid 352 flows from the first chamber 372 to the second fluid chamber 374, which generates a fluid pressure differential across the piston 364 to urge the piston 364 into engagement with the cover 202. For example, the fluid 352 imparts a force on the piston 364 having a component directed in the first direction 368.

In some examples, the first shaft 208 of FIG. 3 forms one or more fluid channels (e.g., oil paths) that extend through the first shaft 208 to fluidly couple the valve associated with the transmission system 104 to the torque converter cavity 354. In such examples, the vehicle controller 105 is configured to control the valve to change position (e.g., open), which conveys the fluid 352 through the fluid channel(s) from a fluid supply of the transmission system 104 to the first chamber 372. As a result, a fluid pressure associated with the first chamber 372 increases.

According to the illustrated example of FIG. 3, the blade damper 301 and the spring damper 302 are connected together in parallel. In such examples, the piston 364, the roller 320, and the first spring damper portion 308 (e.g., the third plate 342) are connected together. Further, the first blade 318 is connected to the second hub 304, and the second spring damper portion 310 is connected to the turbine 348 or the second hub 304 via the turbine 348. In such examples, with respect to the blade damper 301 when the first clutch 303 is operating in the second state thereof, torque is transmittable successively from (a) the cover 202 to the piston 364, (b) the piston 364 to the first plate 338, (c) the first plate 338 to the first roller 320 (and/or the first bearing 324), (d) the first roller 320 to the first blade 318, and (e) the first blade 318 to the second hub 304. Further, with respect to the first spring damper 302 when the first clutch 303 is operating in the second state thereof, torque is transmittable successively from (a) the cover 202 to the piston 364, (b) the piston 364 to the first plate 338, (c) the first plate 338 to the first roller 320 (and/or the first bearing 324), (d) the first roller 320 to the second plate 340, (e) the second plate 340 to the third plate 342, (f) the third plate 342 to the first spring 306, (g) the first spring 306 to the fourth plate 344, (h) the fourth plate to the second shell 365, and (i) the second shell 365 to the second hub 304.

In some examples, the damper assembly 301 or the torque converter 200 may include at least one pendulum damper to increase damping performance. The pendulum damper may be connected to or be integrally formed with the front cover 202, the impeller shell 357, the turbine shell 365, any plate 338, 340 consisting the damper assembly 301, or one or any combination thereof. Preferably, the pendulum damper may be located in a space which is not occupied by the first spring damper 302 and the blade damper 301. Because the first spring damper 302 has a smaller cross-sectional area than the blade damper 301, the pendulum damper may be located in radially inward of the first spring damper 302 or radially outward of the first spring damper 302.

Figure 4:
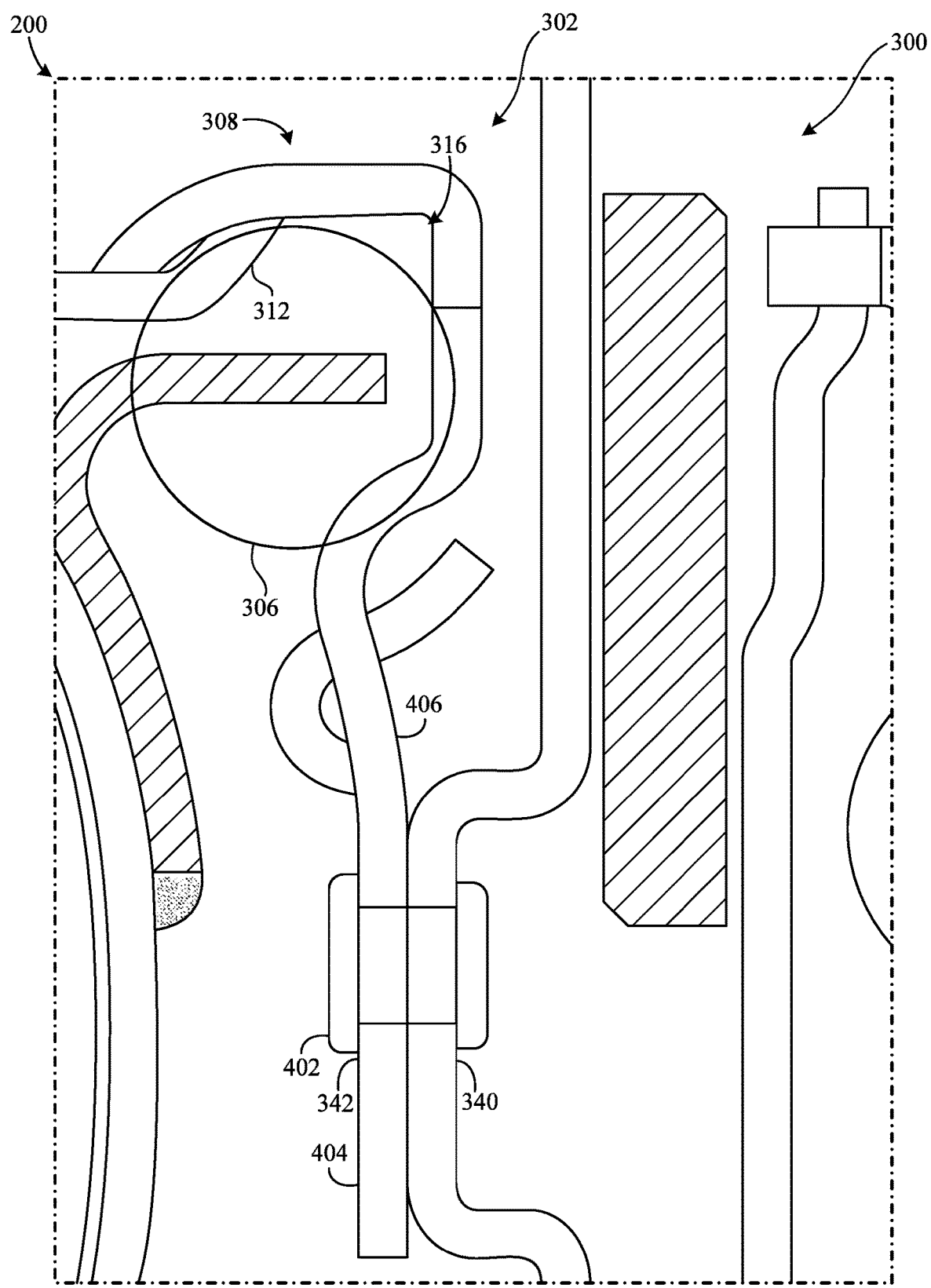
FIGS. 4-7 are enlarged partial views of the torque converter of FIG. 3 and partially show the damper assembly therein.

FIG. 4 is an enlarged partial view of the torque converter 200 of FIG. 3 and partially shows the damper assembly 300. According to the illustrated example of FIG. 4, the first spring damper portion 308 corresponds to and/or is implemented using two plates such as, for example, the second plate 340 and the third plate 342. As such, the second and third plates 340, 342 of FIG. 4 are relatively non-rotatably (i.e., fixedly) coupled together via a first fastening mechanism (e.g., any of a weld, a fastener, etc.) and/or a first fastening method (e.g., any of welding, bolting, riveting, etc.). For example, the damper assembly 300 of FIG. 3 also includes one or more fasteners (e.g., bolt(s), rivet(s), etc.) 402 extending at least partially through the second and third plates 340, 342, one of which is shown in this example. In such examples, the fasteners 402 may be radially distributed relatively to the first axis 210 (not expressly shown). As such, the second and third plates 340, 342 can rotate together relative to the first axis 210 in the same direction. In particular, the second and third plates 340, 342 are rigidly coupled or connected together by such a fastening mechanism and/or method.

Additionally, according to one or more disclosed examples, the third plate 342 of FIG. 4 is configured to carry and/or retain the first spring 306. For example, the third plate 342 of FIG. 4 includes a first portion (e.g., an inner portion) 404 and a second portion (e.g., an outer portion) 406 that is connected to the first portion 404. In particular, the second portion 406 of the third plate 342 is sized and/or shaped to form the first spring cavity 316 in which the first spring 306 is positioned. Accordingly, the third plate 342 of FIG. 4 is sometimes referred to as a retainer plate. As shown in FIG. 4, the third plate 342 is positioned on the second plate 340 and extends away from the fastener(s) 402 radially outward relative to the first axis 210. Further, in such examples, the second portion 406 of the third plate 342 is sized and/or shaped to form the first seat 312 associated with engaging the first end of the first spring 306.

Figure 5:
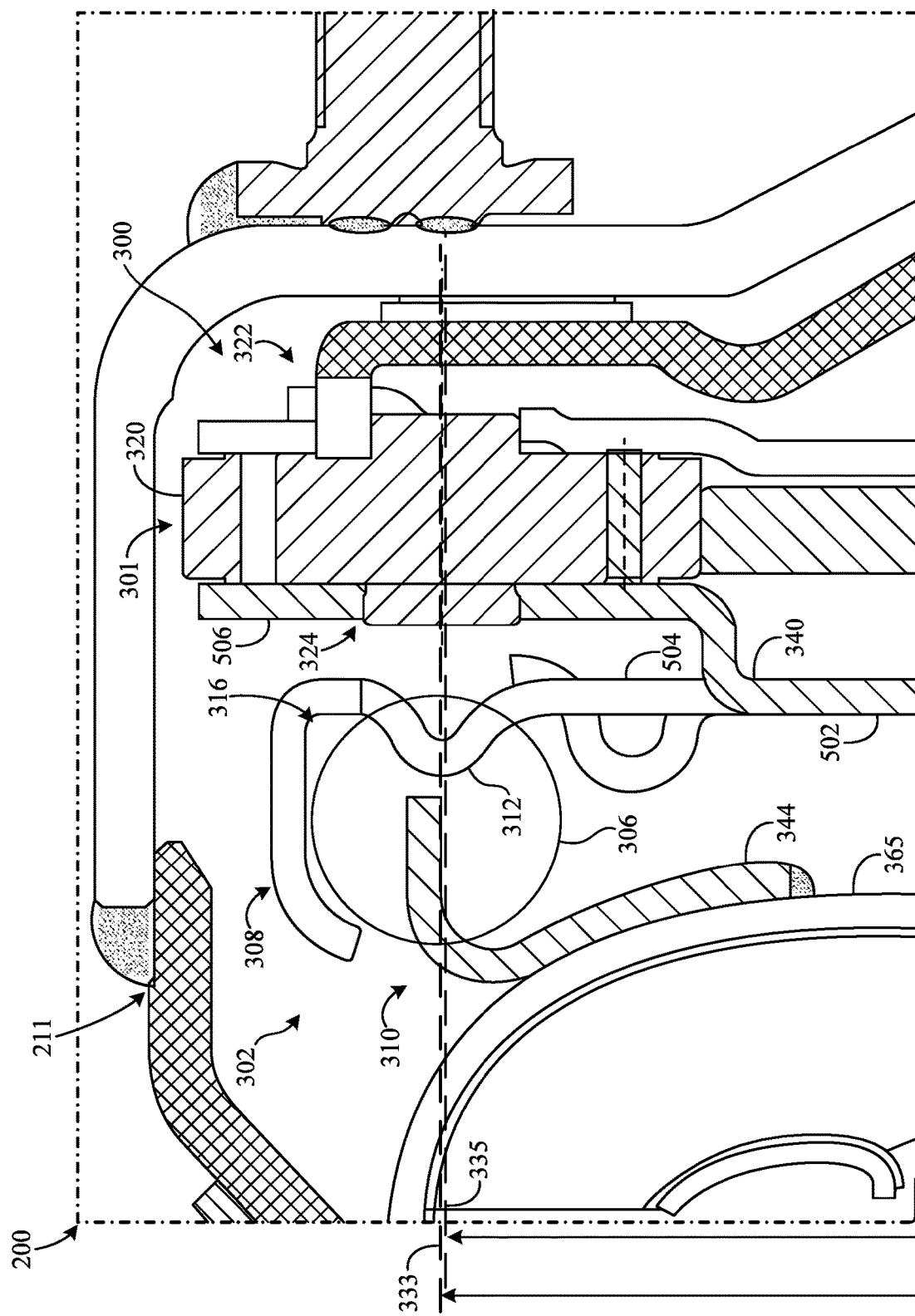

FIG. 5 is another enlarged partial view of the torque converter 200 of FIG. 3 and partially shows the damper assembly 300. In contrast to the illustrated example of FIG. 3, the damper assembly 300 of FIG. 5 is configured such that the first PCD 333 and the second PCD 335 are substantially equal or the same. Additionally, in contrast to the illustrated example of FIG. 4, the first spring damper portion 308 of FIG. 5 corresponds to and/or is implemented using the second plate 340 but not the third plate 342 (i.e., a single plate 340). In such examples, the second plate 340 includes a first portion (e.g., an inner portion) 502 and a second portion (e.g., an outer portion) 504 that is connected to the first portion 502, as shown in FIG. 5. The second portion 504 of the second plate 340 extends away from the first portion 502 radially outward relative to the first axis 210 (not expressly shown). In particular, the second plate portion 504 of FIG. 5 is sized and/or shaped to form the first spring cavity 316 in which the first spring 306 is positioned. As such, the second plate 340 of FIG. 5 is configured to carry and/or retain the first spring 306 (and/or the other spring(s)). Further, in such examples, the second plate portion 504 is also sized and/or shaped to form the first seat 312 associated with engaging the first end of the first spring 306.

Additionally, the second plate 340 of FIG. 5 includes a third portion 506 connected to the first and second portions 502, 504. In particular, the third portion 506 extends and/or curves away from the first and second portions 502, 504 to receive the bearing 324 or a component (e.g., an inner race or a pin) associated with the first roller 320. Thus, according to one or more disclosed examples, the second plate 340 forms both the first blade damper portion 322 and the first spring damper portion 308, as shown in FIG. 5.

According to the illustrated example of FIG. 5, the second spring damper portion 310 is implemented using a single plate such as, for example, the fourth plate 344. The fourth plate 344 of FIG. 5 is non-relatively rotatably (i.e., fixedly) coupled to the second shell 365, for example, via one or more fasteners and/or fastening methods or techniques. As such, the fourth plate 344 of FIG. 5 provides the first damping torque generated by the first spring 306 to the second shell 365.

Figure 6:
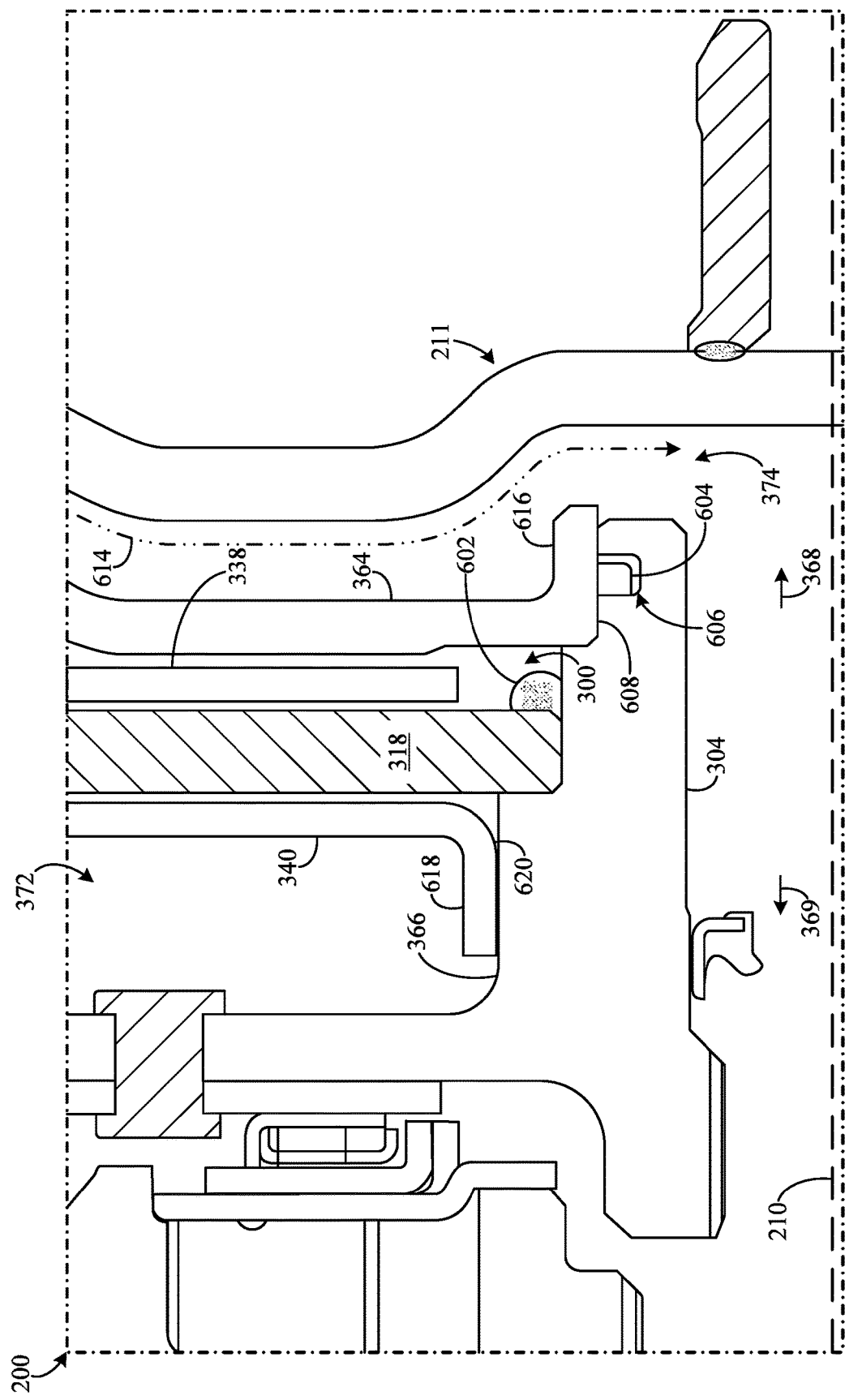

FIG. 6 is another enlarged portion view of the torque converter 200 of FIG. 3 and partially shows the damper assembly 300. The first blade 318 of FIG. 6 is supported by the second hub 304. For example, as shown in FIG. 6, the first blade 318 is positioned on the outer surface 366 of the second hub 304. According to the illustrated example of FIG. 6, the first blade 318 of FIG. 3 is relatively non-rotatably (i.e., fixedly) coupled to the second hub 304 via a second fastening mechanism (e.g., any of a weld, a fastener, etc.) and/or a second fastening method (e.g., any of welding, bolting, riveting, etc.). As shown in FIG. 3, a weld 602 positioned on the first blade 318 and the hub outer surface 366 is coupling the first blade 318 to the second hub 304. In particular, the first blade 318 and the second hub 304 are rigidly coupled or connected together by such a fastening mechanism and/or method.

The piston 364 of FIG. 6 is configured to slide along an area of the outer surface 366 proximate to an end of the second hub 304, for example, in response to a fluid pressure imparted on the piston 364. In such examples, to facilitate generating a fluid pressure differential across the piston 364, the torque converter 200 of FIG. 6 includes a seal (e.g., an O-ring) 604 operatively coupled between the piston 364 and the second hub 304. For example, as shown in FIG. 6, the seal 604 is positioned in and/or extends through a groove (e.g., an outer circumferential groove) 606 that is formed by the outer surface 366 of the second hub 304. In particular, the seal 604 sealingly engages the outer surface 366 of the second hub 304, an inner surface (e.g., an inner circumferential surface) 608 of the piston 364, and one or more walls of second hub 304, thereby forming a fluid seal. As a result, when the first clutch 303 changes from the first state thereof to the second state thereof, the flow of the fluid 352 between the first and second chambers 372, 374 is improved by the seal 604. In such examples, the fluid 352 flows between the piston 364 and the cover 202 substantially along a path 614 during clutch engagement, as represented the dotted/dashed line of FIG. 6.

In some examples, the piston 364 includes a second flange 616 that is positioned thereon at or proximate to an end (e.g., an inner radial end) of the piston 364. The second flange 616 extends over the groove 606 away from the first blade 318 along the first axis 210 in the first direction 368. In such examples, the second flange 616 provides the inner surface 608 of the piston 364, which may be spaced by a relatively small distance from the outer hub surface 366. As a result, the second flange 616 facilitates maintaining a position and/or an orientation of the piston 364 relative to the second hub 304.

According to the illustrated example of FIG. 6, the second plate 340 is also supported by the second hub 304. For example, as shown in FIG. 6, the second plate 340 is positioned on the outer surface 366 of the second hub 304. Additionally, the second plate 340 of FIG. 6 is rotatable relative to the second hub 304. In such examples, the second plate 340 forms and/or defines a third flange 618 that is positioned on the second plate 340 at or proximate to an inner radius of the second plate 340, similar to the second flange 616 of the piston 364.

The third flange 618 of FIG. 6 extends along an area of the hub outer surface 366 away from the blade 318 along the first axis 210 in the second direction 369. Further, the third flange 618 has an inner surface (e.g., a curved and/or circular surface) 620 that is spaced by a relatively small distance from the outer surface 366 of the second hub 304. Additionally or alternatively, the inner surface 620 of the third flange 618 slidably engages the outer surface 366 of the second hub 304. In this manner, the third flange 618 facilitates maintaining a position and/or an orientation of the second plate 340 relative to the second hub 304. In particular, the second hub 304 of FIG. 6 centers the first spring damper portion 308 relative to the housing 211 by engaging the second flange 618 and/or, more generally, the flange inner surface 622.

Figure 7:
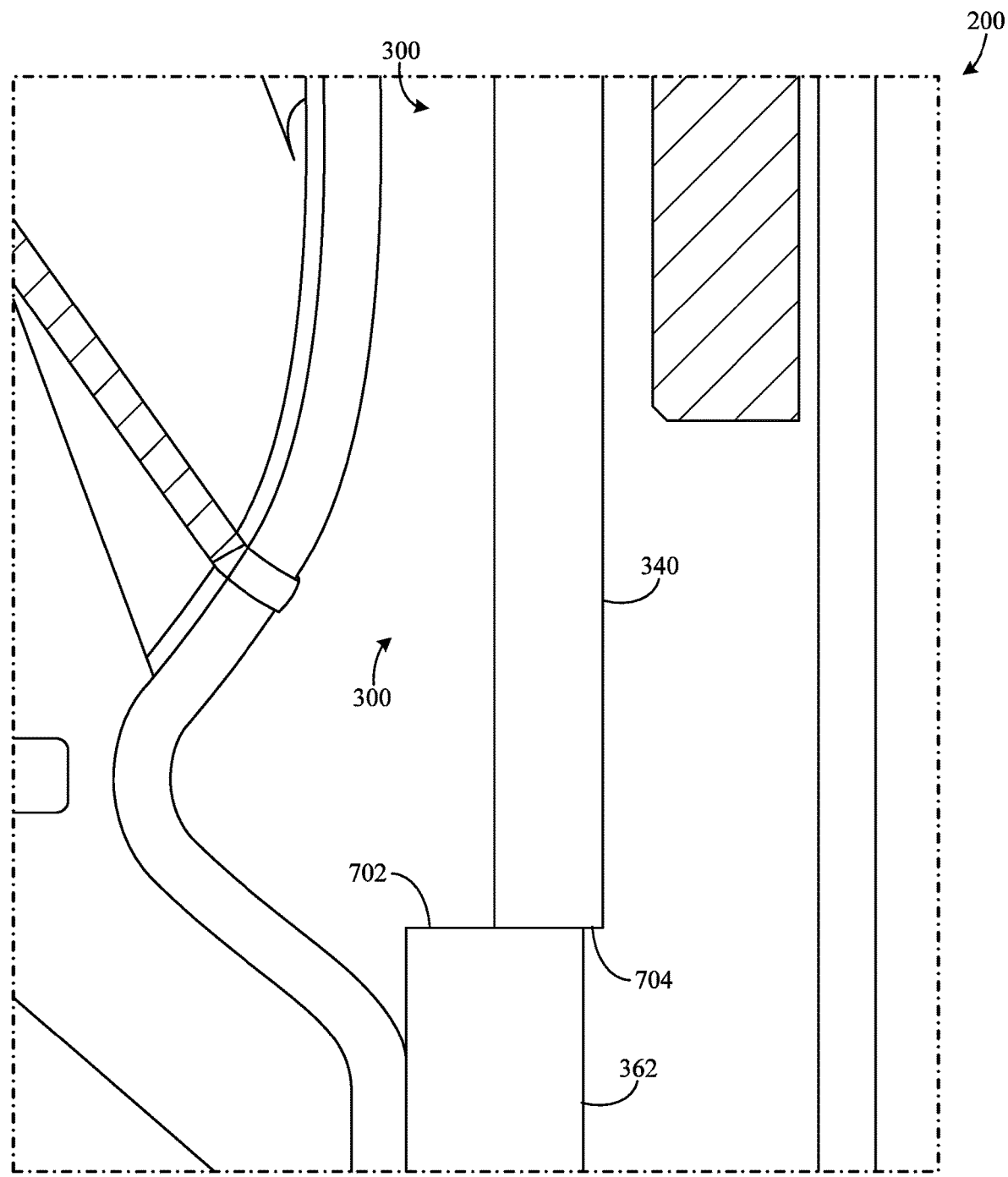

FIG. 7 is another enlarged portion view of the torque converter 200 of FIG. 3 and partially shows the damper assembly 300. In particular, the second plate 340 is supported by the first flange 362 of the second hub 304. For example, instead of engaging the outer surface 366 of the second hub 304 (as shown in FIG. 3), the second plate 340 of FIG. 7 abuts an outer surface (e.g., an outer circumferential surface) 702 formed and/or defined by the first flange 362. According to the illustrated example of FIG. 7, an inner surface (e.g., an inner circumferential surface) 704 of second plate 340 is proximate to and/or positioned on the outer surface 702 of the first flange 362. That is, in some such examples, the inner surface 704 of the second plate 340 is spaced by a relatively small distance from the outer surface 702 of the first flange 362. Additionally or alternatively, the inner surface 704 of the second plate 340 slidably engages the outer surface 702 of the first flange 362, which centers the second plate 340 relative to the housing 211.

Figure 8:
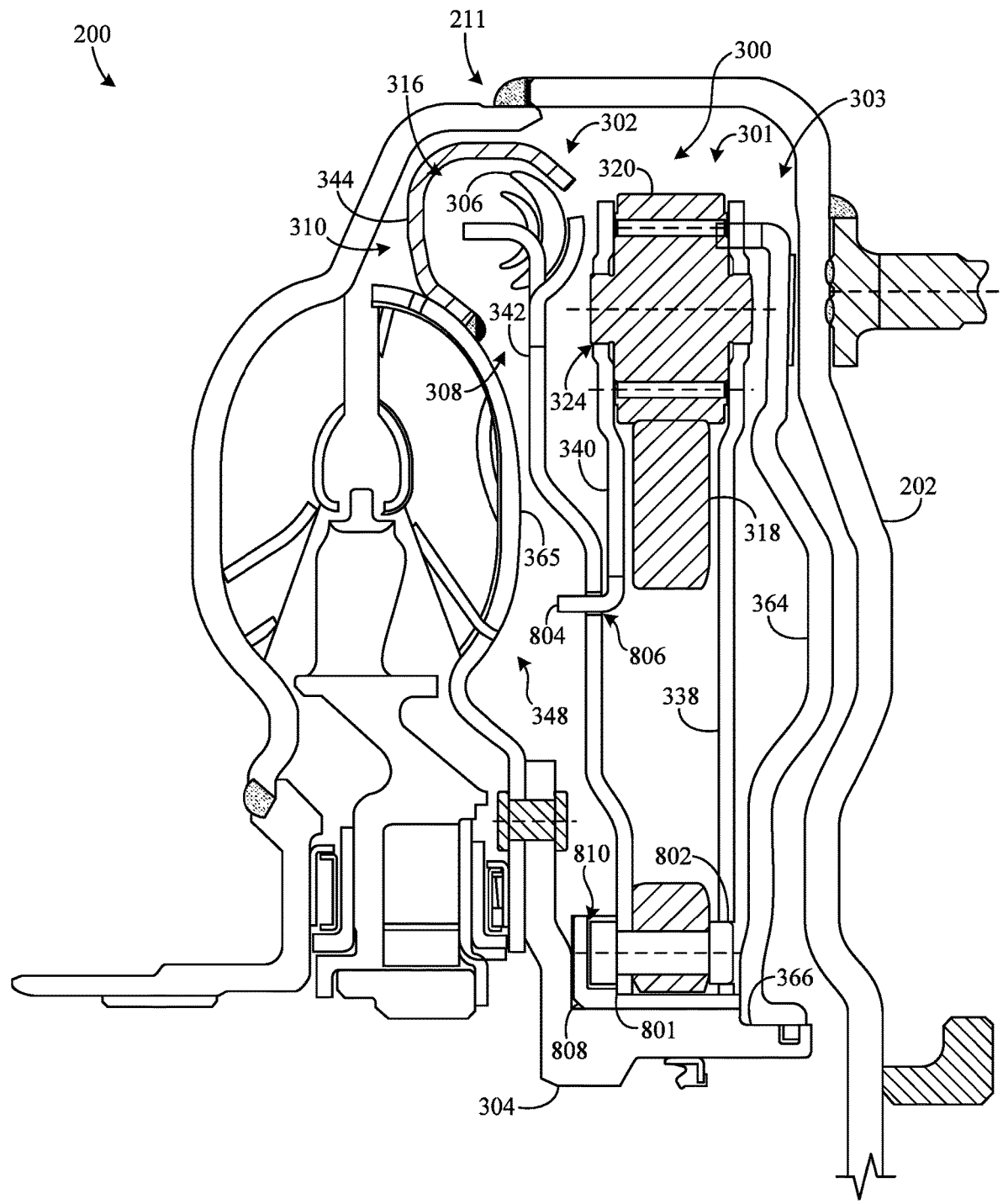
FIGS. 8-10 are different partial cross-sectional views of the torque converter of FIG. 2 along line A-A and show the example damper assembly therein having different configurations in accordance with the teachings of this disclosure.

FIG. 8 is a different partial cross-sectional view of the torque converter 200 of FIG. 2 along line A-A and shows the damper assembly 300 therein having a different configuration in accordance with the teachings of this disclosure. According to the illustrated example of FIG. 8, the torque converter 200 includes the housing 211, the damper assembly 300, the first clutch 303, the second hub 304, and the turbine 348. The damper assembly 300 of FIG. 8 is operatively interposed between the first clutch 303 and the second hub 304 and includes the blade damper 301 and the first spring damper 302. Further, the first clutch 303 of FIG. 8 includes the piston 364.

The third plate 342 of FIG. 8 corresponds to and/or is used to implement the first spring damper portion 308. Further, the fourth plate 344 of FIG. 8 corresponds to and/or is used to implement the second spring damper portion 310. In some such examples, the fourth plate 344 is configured to carry and/or retain the first spring 306 (and/or the other spring(s)). For example, as shown in FIG. 8, the fourth plate 344 is sized and/or shaped to form the first spring cavity 316 in which the first spring 306 is positioned According to the illustrated example of FIG. 8, the blade damper 301 and the first spring damper 302 are connected together in series. The blade damper 301 and the first spring damper 302, together, are configured to dampen the torsional vibration(s) received by the housing 211 when the first clutch 303 is in the second state thereof. In contrast to the illustrated example of FIG. 3, the damper assembly 300 of FIG. 8 is configured such that the blade 318 provides the second damping torque to the first spring damper portion 308, instead of the second hub 304. Further, in contrast to the illustrated example of FIG. 3, the first roller 320 and/or the first bearing 324 of FIG. 8 do not provide the engine torque to first spring damper portion 308. Accordingly, the first spring damper 302 of FIG. 8 is secondary relative to the blade damper 301 such that an output of the blade damper 301 is applied as an input to the spring damper 302. For example, with respect to the both the blade damper 301 and the first spring damper 302 when the first clutch 303 is operating in the second state thereof, torque is transmittable successively from (a) the cover 202 to the piston 364, (b) the piston 364 to the first plate 338, (c) the first plate 338 to the first roller 320 (and/or the first bearing 324), (d) the first roller 320 to the first blade 318, (e) the first blade 318 to the third plate 342, (f) the third plate 342 to the first spring 306, (g) the first spring 306 to the fourth plate 344, (h) the fourth plate 344 to the second shell 365, and (i) the second shell 365 to the second hub 304.

The first blade 318 of FIG. 8 is non-relatively rotatably (i.e., fixedly) coupled to the third plate 342 via a third fastening mechanism (e.g., any of a weld, a fastener, etc.) and/or a third fastening method (e.g., any of welding, bolting, riveting, etc.). As shown in FIG. 8, the third plate 342 has a proximal end 801 that is adjacent and/or engaging the first blade 318. In such examples, the damper assembly 300 of FIG. 8 includes one or more fasteners (e.g., bolt(s), rivet(s), etc.) 802 extending through first blade 318 and the third plate 342 at or near the proximal end 801 of the third plate 342, one of which is shown in this example. As a result, when the first clutch 303 of FIG. 8 is in the second state thereof, the engine torque is transmitted from the housing 211 to the second hub 304, first through the blade damper 301 and then through the first spring damper 302.

According to the illustrated example of FIG. 8, the second plate 340 is movably coupled to the third plate 342 such that the second plate 340 and the third plate 342 can at least partially rotate relative to the each other. In such examples, the second plate 340 includes a fourth flange 804 positioned thereon at or proximate to an inner radius of the second plate 340. Additionally, the third plate 342 of FIG. 8 includes a slot 806 positioned thereon and extending at least partially around the first axis 210 at a radius relative to the first axis 210 corresponding to the inner radius of the second plate 340. In particular, the fourth flange 804 of FIG. 8 is configured to slide through the slot 806 to center the third plate 342 relative to the housing 211. For example, the fourth flange 804 is slidable through the slot 806 between a first end of the slot 806 and a second end of the slot 806 opposite the first end.

According to the illustrated example of FIG. 8, the damper assembly 300 includes a fifth plate 808 interposed between the first blade 318 and the second hub 304. The fifth plate 808 defines a groove 810 on an outer surface of the fifth plate 808. As shown in FIG. 8, the first blade 318, the first plate 338, the third plate 342, and the fastener(s) 802 are positioned in the groove 810. The fifth plate 808 of FIG. 8 is configured to slide against the outer surface 366 of the second hub 304 to provide support to the first blade 318, the first plate 338, and the third plate 342. Alternatively, the fifth plate 808 may be non-relatively rotatably (i.e., fixedly) coupled to the second hub 304, for example, via a fastening mechanism and/or a fastening method.

Figure 9:
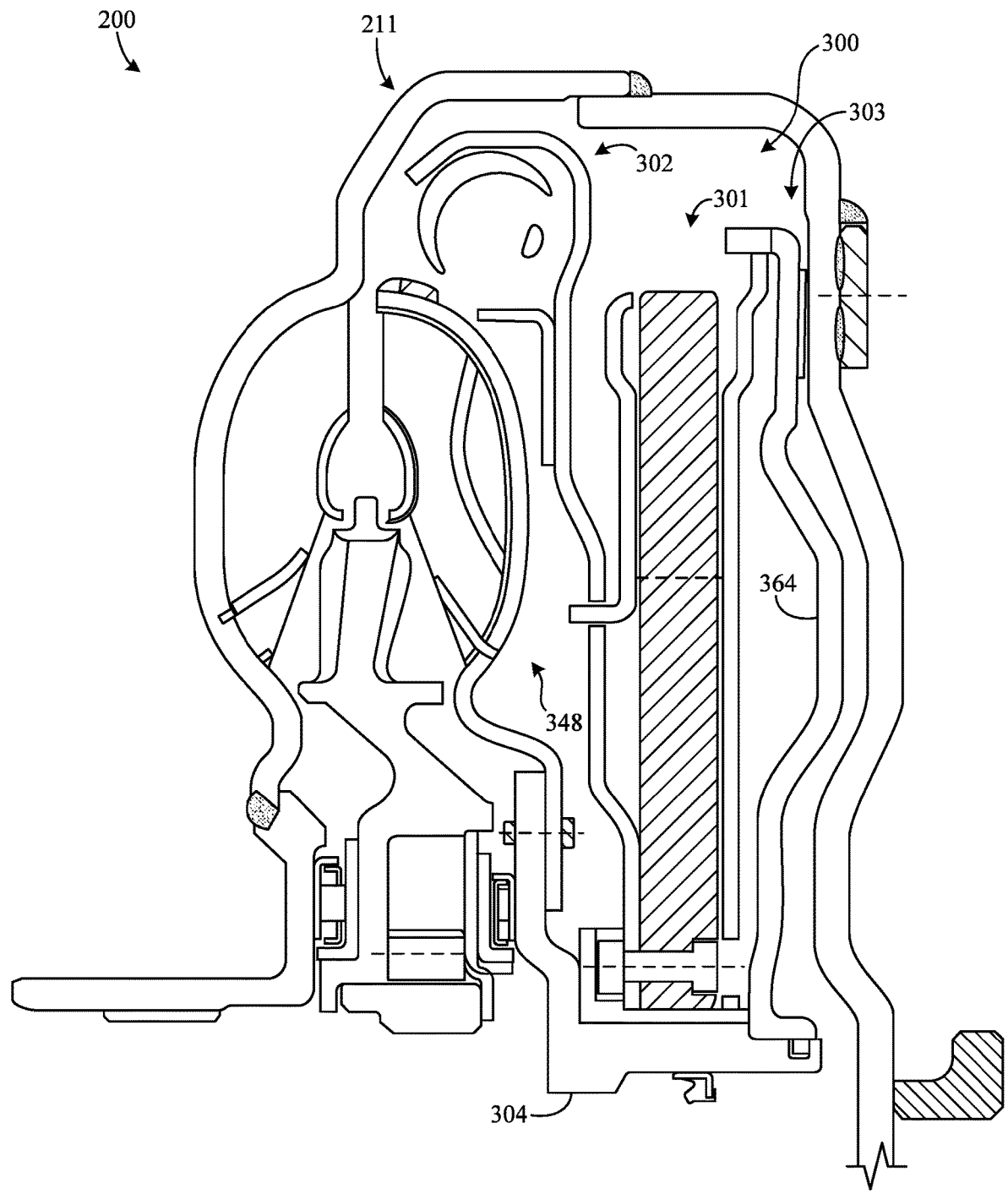

FIG. 9 is a different partial cross-sectional view of the torque converter 200 of FIG. 2 along line A-A and shows the damper assembly 300 therein having a different configuration in accordance with the teachings of this disclosure. According to the illustrated example of FIG. 9, the torque converter 200 includes the housing 211, the damper assembly 300, the first clutch 303, the second hub 304, and the turbine 348. The damper assembly 300 of FIG. 8 is operatively interposed between the first clutch 303 and the second hub 304 and includes the blade damper 301 and the first spring damper 302. Further, the first clutch 303 of FIG. 8 includes the piston 364. Similar to the damper assembly 300 of FIG. 8, the blade damper 301 and the first spring damper 302 of FIG. 9 are connected together in series.

Figure 10:
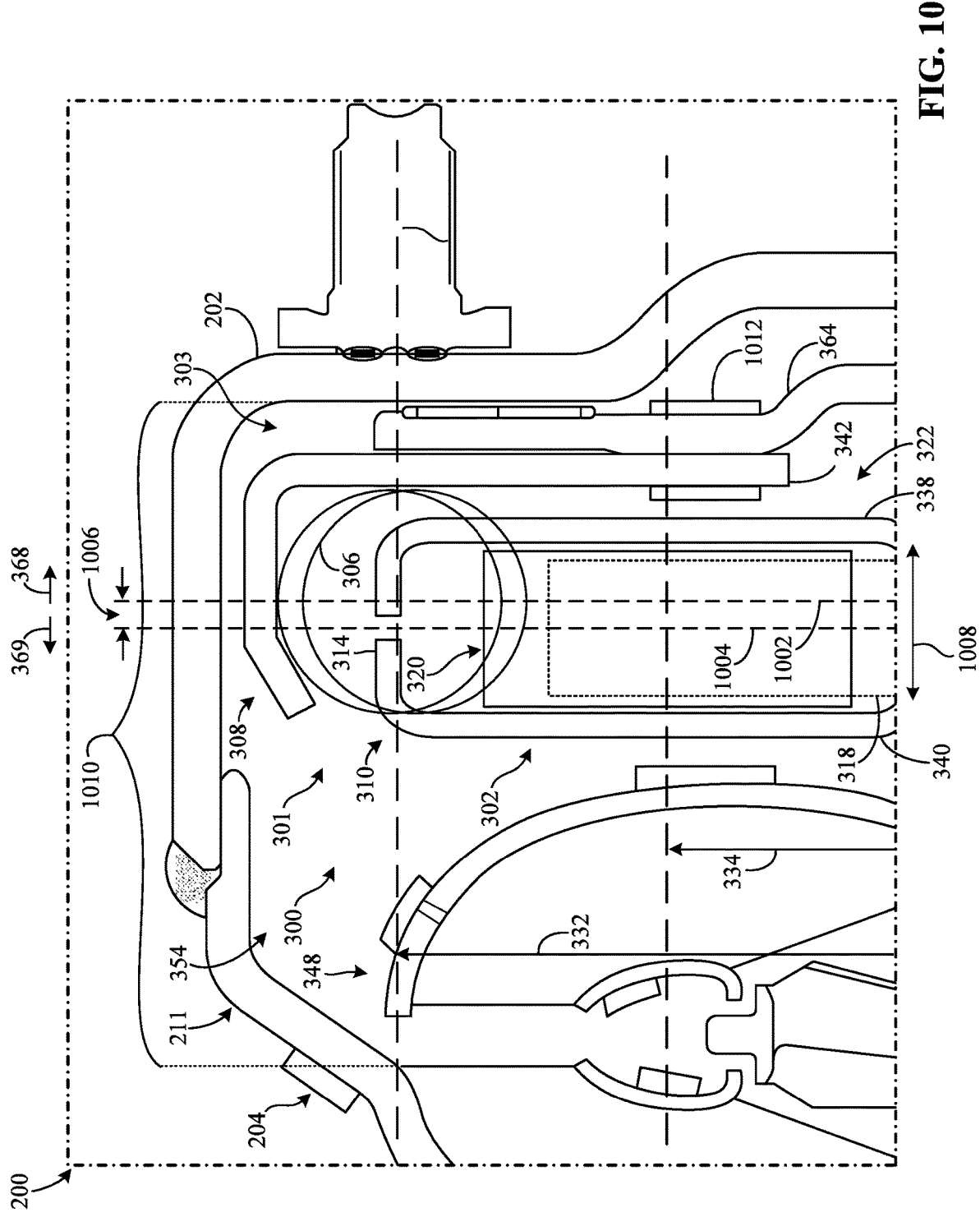

FIG. 10 is a different partial cross-sectional view of the torque converter 200 of FIG. 2 along line A-A and shows the damper assembly 300 therein having a different configuration in accordance with the teachings of this disclosure. According to the illustrated example of FIG. 10, the torque converter 200 includes the housing 211, the damper assembly 300, the first clutch 303, the second hub 304 (not expressly shown), and the turbine 348. The damper assembly 300 of FIG. 10 is operatively interposed between the first clutch 303 and the second hub 304. Further, the damper assembly 300 of FIG. 10 includes the blade damper 301 and the first spring damper 302, and the first clutch 303 of FIG. 10 includes the piston 364 in the housing 211. The blade damper 301 and the first spring damper 302, together, are configured to dampen the torsional vibration(s) received by the housing 211 when the first clutch 303 is in the second state thereof.

According to the illustrated example of FIG. 10, the first spring 306 and the first roller 320 are positioned at substantially different radii relative the first axis 210 (not expressly shown). For example, the first radius 332 of FIG. 10 is substantially larger than the second radius 334. In such examples, the first spring 306 may partially surround the first roller 320 and/or the first blade 318 (as represented by the dotted/dashed lines of FIG. 10). Further, as shown in FIG. 10, a second axis (e.g., a vertical axis) 1002, perpendicular to the first axis 210, extends radially outward relative to the first axis 210 through a central area or center (e.g., a center of mass) of the first spring 306. Similarly, a third axis (e.g., a vertical axis) 1004, perpendicular to the first axis 210, extends radially outward relative to the first axis 210 through a central area or center (e.g., a center of mass) of the first roller 320.

In some examples, the center of the first roller 320 and the center of the first spring 306 are the same (i.e., the first roller 320 and the first spring 306 are concentric). In such examples, the second axis 1002 and the third axis 1004 define a single axis. In other words, the centers of the respective first roller 320 and first spring 306 are vertically aligned to each other. Further, in such examples, the first spring 306 and the first roller 320 are spaced by the same distance (e.g., a horizontal distance) from a side of the cover 202.

Alternatively, the center of the first roller 320 is offset relative to the center of the first spring 306, as shown in FIG. 10. According to the illustrated example of FIG. 10, the second axis 1002 and the third axis 1004 define an offset 1006 that is about five (5) times or less greater than a thickness 1008 of the first roller 320. In other words, the centers of the respective first roller 320 and first spring 306 are offset relative to each other by a distance corresponding to such a value on both sides of the blade damper 301. Beyond this offset limitation, proper torque converter packaging may be difficult to achieve. The offset 1006 of FIG. 10 may extend away from the center of the first roller 320 in one of the first direction 368, the second direction 369, or both the first and second directions 368, 369. In some examples, the first spring 306 and/or the first roller 320 can generally be positioned within an area 1010 of the housing cavity 354, a boundary of which is defined by the impeller 204 and the cover 202.

According to the illustrated example of FIG. 10, the first spring damper portion 308 corresponds to and/or is implemented using the third plate 342. In contrast to the illustrated example of FIG. 3, the third plate 342 of FIG. 10 is connected to the piston 364, instead of the turbine 348. For example, the third plate 342 of FIG. 10 is positioned on the piston 364 at or proximate to an outer radius of the piston 364. As shown in FIG. 10, the third plate 342 is interposed between the piston 364 and the first plate 338. Further, the third plate 342 of FIG. 10 is non-relatively rotatably (i.e., fixedly) coupled to the piston 364 via a fourth fastening mechanism (e.g., any of a weld, a fastener, etc.) and/or a fourth fastening method (e.g., any of welding, bolting, riveting, etc.). For example, the damper assembly 300 of FIG. 100 includes one or more fasteners (e.g., bolt(s), rivet(s), etc.) 1012 that extend through the third plate 342 and the piston 364, one of which is shown in this example. The fastener(s) 1012 of FIG. 10 may be radially distributed relative to the first axis 210. As such, the piston 364 of FIG. 10 supports the third plate 342 and the first spring 306.

Additionally, according to the illustrated example of FIG. 10, the second spring damper portion 310 corresponds to and/or is implemented using the first blade damper portion 322 such as, for example, the first plate 338 and the second plate 340. That is, the first blade damper portion 322 of FIG. 10 also corresponds to and/or is implemented using the first and second plates 338, 340. In particular, the first plate 338 and/or the second plate 340 form the second seat 314 associated with engaging the second end of the first spring 306. Such a configuration of the damper assembly 300, as shown in FIG. 10, is suitable when the blade damper 301 and the first spring damper 302 are connected together in series whereby the blade damper 301 is secondary relative to the first spring damper 302 such that an output of the first spring damper 302 is applied as an input to the blade damper 301.

Figure 11:
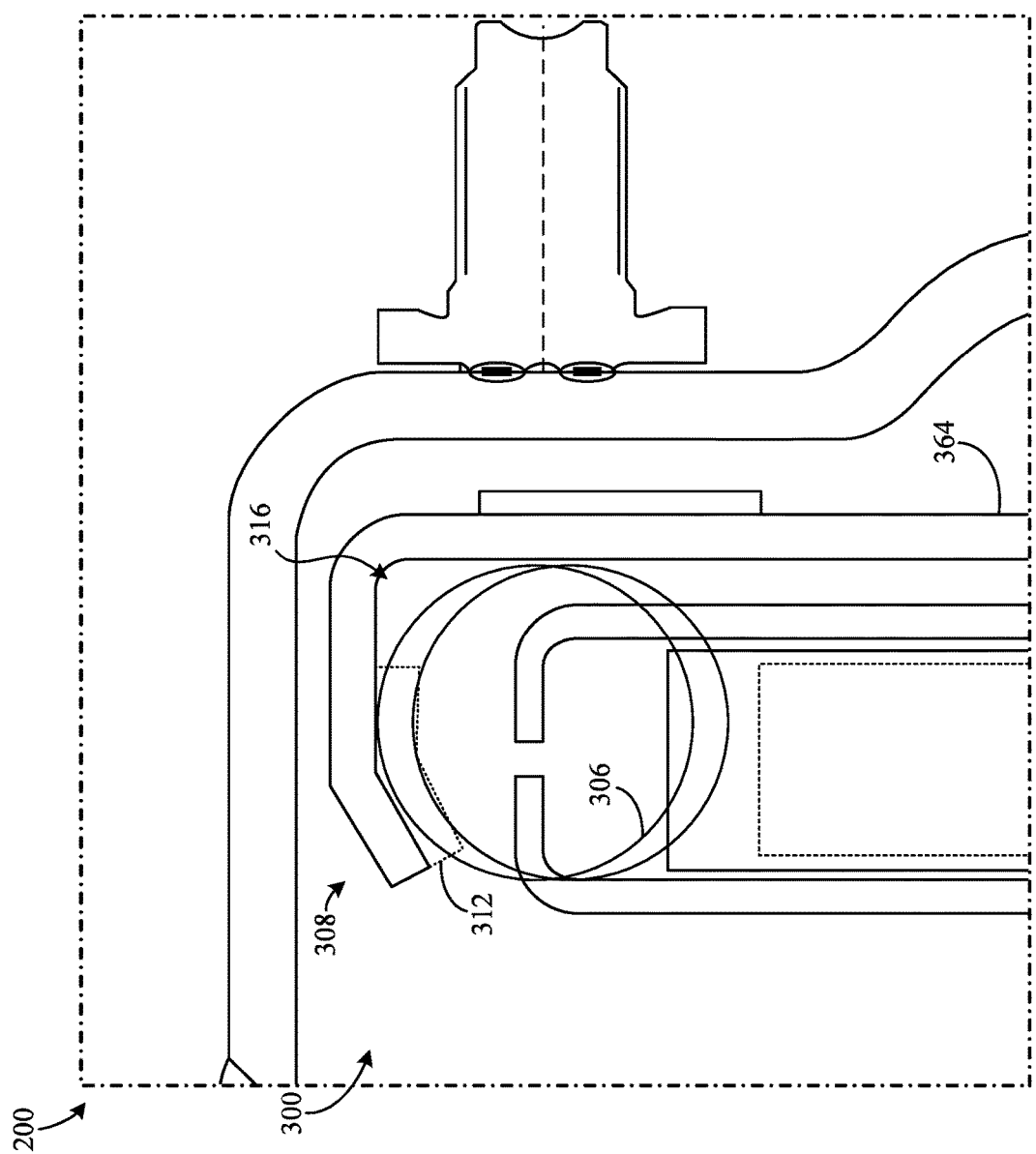
FIG. 11 is an enlarged portion view of the torque converter of FIG. 10 and partially shows the example damper assembly therein.

FIG. 11 is an enlarged portion view of the torque converter 200 of FIG. 10 and partially shows the damper assembly 300. In contrast to the illustrated example of FIG. 10, the first spring damper portion 308 of FIG. 11 corresponds to and/or is implemented using the piston 364, instead of the third plate 342. In particular, the piston 364 of FIG. 11 is sized and/or shaped to form the first spring cavity 316 in which the first spring 306 is positioned. As such, the piston 364 of FIG. 11 carries and/or retains the first spring 306. Additionally, in such examples, the piston 364 of FIG. 11 is also sized and/or shaped to form the first seat 312 (as represented by the dotted/dashed lines of FIG. 11) associated with engaging the first end of the first spring 306.

FIG. 12 is a view of the blade damper 301 and shows an example configuration thereof in accordance with the teachings of this disclosure. According to the illustrated example of FIG. 12, the blade damper 301 includes the first blade 318, the first roller 320, a second blade 1202, and a second roller 1204. The first roller 320 is substantially maintained at the second radius 334 relative to the first axis 210, for example, via the first plate 338 and/or the second plate 340, as previously mentioned. The first blade 318 of FIG. 12 extends away from the second hub 304 radially outward relative to the first axis 210 and curves at least partially around the second hub 304. In particular, as the first roller 320 rolls along the outer surface 325 of the first blade 318 away from an end 1208 of the first blade 318 across an engagement portion 1206 of the first blade 318, the first roller 320 imparts a force on the outer surface 325 to urge the first blade 318 toward the second hub 304 (i.e., the first blade 318 bends). As a result, the first blade 318 generates the second damping torque based on the force and applies the torque to the second hub 304 to drive the second hub 304.

Conversely, as the first roller 320 rolls along the outer surface 325 of the first blade 318 toward the first end 1208 across the engagement portion 1206, the first blade 318 moves away from the second hub 304 (i.e., the first blade 318 unbends), and a magnitude of the force imparted on the outer surface 325 decreases. Such a force and/or torque generated in this manner is/are based on one or more parameters associated with the blade damper 301 such as, for example, one of: (a) an angular position of the first roller 320 relative to an angular position of the second hub 304; (b) a shape (e.g., a curvature) of the first blade 318; (c) a thickness 1210 of the first blade 318; (d) a diameter of the first bearing 324; (e) a position of the first roller 320 relative to the first axis 210, (f) one or more material properties (e.g., strength, rigidity, elasticity, etc.) associated with the first blade 318, (g) etc., or (h) any combination thereof. The thickness 1210 of the first blade 318 may be substantially uniform across a length of the blade. In some examples, the thickness 1210 of the first blade 318 is less than 12 mm.

Although FIG. 12 depicts aspects in connection with the first blade 318 and the first roller 320, in some examples, such aspects likewise apply to the second blade 1202 and the second roller 1204. In particular, implementing the blade damper 301 using multiple blades 318, 1202 and multiple rollers 320, 1204 in this manner improves damper performance and/or increases loading capacity.

Figure 13:
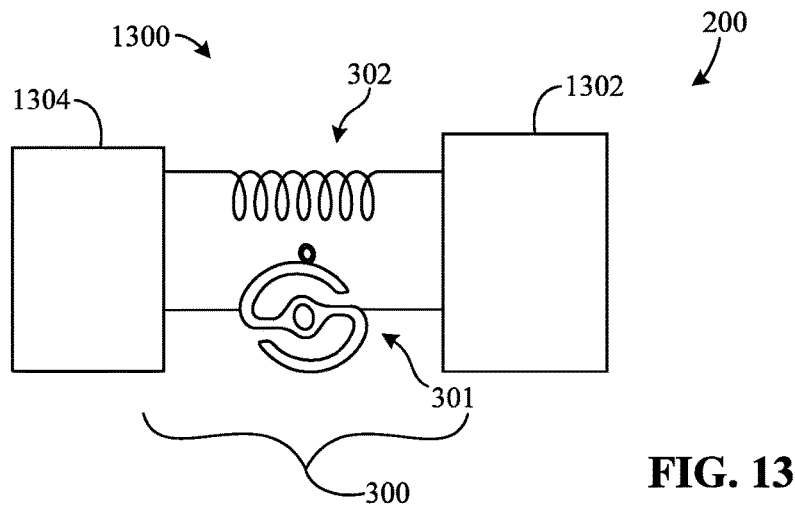
FIGS. 13-18 are schematic illustrations of the torque converter of FIG. 2 and show example damper configurations in accordance with the teachings of this disclosure.

FIG. 13 is a schematic illustration of the torque converter 200 of FIG. 2 and shows a first damper configuration (e.g., a parallel configuration) 1300 in accordance with the teachings of this disclosure. According to the illustrated example of FIG. 13, the torque converter 200 includes an input or first torque converter portion 1302, an output or second torque converter portion 1304, and the damper assembly 300. The damper assembly 300 of FIG. 13 is operatively interposed between the first torque converter portion 1302 and the second torque converter portion 1304 whereby torque is transmittable through the blade damper 301 and the first spring damper 302 from the first torque converter portion 1302 to the second torque converter portion 1304. In particular, the blade damper 301 and the first spring damper 302, together, are configured to dampen a torsional vibration received by the torque converter 200 when the first clutch 303 is in the second state thereof.

The first torque converter portion 1302 of FIG. 13 corresponds to and/or is implemented using one of (a) a portion (e.g., the cover 202) of the housing 211, (b) a portion (e.g., the piston 364) of the first clutch 303, or (c) an assembled combination thereof. In particular, the first torque converter portion 1302 of FIG. 13 is connected to the engine 102 to receive the torque generated by the engine 102. Further, the first torque converter portion 1302 of FIG. 13 is connected to the damper assembly 300 to provide the engine torque to the blade damper 301 and/or the first spring damper 302 (e.g., when the first clutch 303 is in the second state thereof).

The second torque converter portion 1304 of FIG. 13 corresponds to and/or is implemented using one of (a) a portion (e.g., the flange 362) of the second hub 304, (b) a portion (e.g., the second shell 365) of the turbine 348, or (b) an assembled combination thereof. In particular, the second torque converter portion 1304 is connected to the damper assembly 300 to receive an output of the damper assembly 300. Further, the second torque converter portion 1304 is connected to the first shaft 208 to provide the output of the damper assembly 300 to the vehicle transmission system 104.

According to the illustrated example of FIG. 13, the blade damper 301 and the first spring damper 302 of FIG. 13 are connected together in parallel between the first torque converter portion 1302 and the second torque converter portion 1304 to provide the first damper configuration 1300. In such examples, when the torque converter 200 receives the engine torque while the first clutch 303 is in the second state thereof, the damper assembly 300 of FIG. 13 splits the engine torque and/or otherwise distributes the engine torque to the blade damper 301 and the first spring damper 302 before the second torque converter portion 1304 receives the engine torque. Stated differently, in such examples, the damper assembly 300 transfers (a) a first portion of the engine torque (i.e., a torque that is substantially less than the engine torque) from the first torque converter portion 1302 to a portion (e.g., the first roller 320) of the blade damper 301 and (b) a second portion of the engine torque (i.e., a torque that is substantially less than the engine torque) from the first torque converter portion 1302 to a portion (e.g., one of the second plate 340 or the third plate 342) of the first spring damper 302. In this manner, each of the blade damper 301 and the first spring damper 302 interact with a separate or different portion of the engine torque when connected together in parallel.

Figure 14:
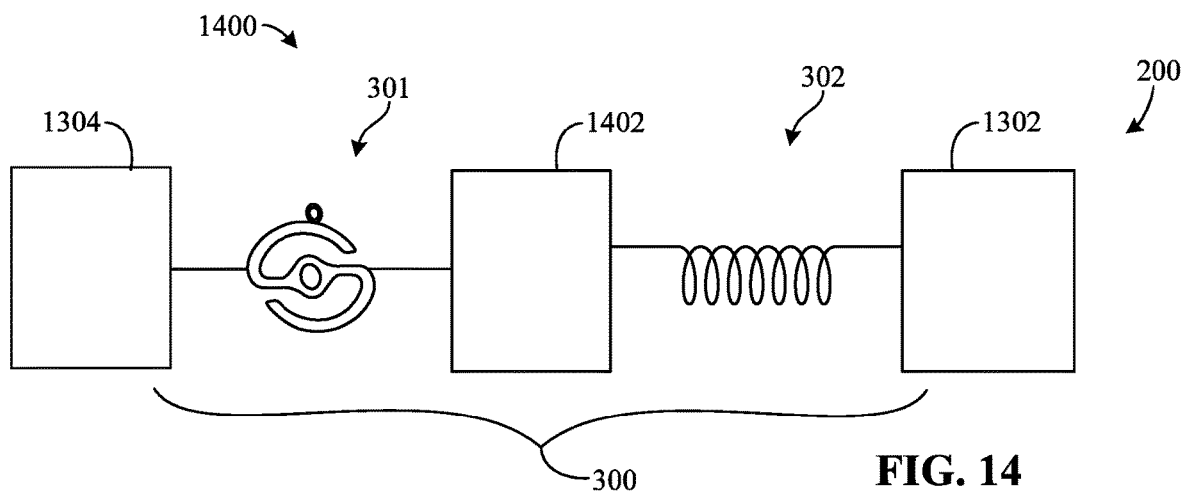

FIG. 14 is another schematic illustration of the torque converter 200 of FIG. 2 and shows a second damper configuration (e.g., a first series configuration) 1400 in accordance with the teachings of this disclosure. In contrast to the illustrated example of FIG. 13, the first torque converter portion 1302 of FIG. 14 is connected only to the first spring damper 302 to provide the engine torque to the first spring damper 302. Further, second torque converter portion 1304 of FIG. 14 is connected only to the blade damper 301 to receive an output from the blade damper 301. According to the illustrated example of FIG. 14, the torque converter 200 also includes an intermediate or third torque converter portion 1402 interposed between the first and second torque converter portions 1302, 1304. Also, the third torque converter portion 1402 is interposed between the blade damper 301 and the first spring damper 302. In some examples, the intermediate portion 1402 of FIG. 14 corresponds to and/or is implemented using one of (a) the first plate 338, (b) the second plate 340, (c) the third plate 342, (d) the fifth plate 808, or (d) any assembled combination thereof. In particular, the intermediate portion 1402 of FIG. 14 is connected between the blade damper 301 and the first spring damper 302 such that torque is transferable from the first spring damper 302 to the blade damper 301.

According to the illustrated example of FIG. 14, the blade damper 301 and the first spring damper 302 are connected together in series between the first torque converter portion 1302 and the second torque converter portion 1304 to provide the second damper configuration 1400. In particular, the blade damper 301 is secondary relative to the first spring damper 302 such that output of the first spring damper 302 is applied as an input to the blade damper 301. Accordingly, when the torque converter 200 receives the engine torque while the first clutch 303 is in the second state thereof, the damper assembly 300 of FIG. 14 does not split the engine torque or distribute the engine torque to the blade damper 301 and the first spring damper 302. Instead, in such examples, the damper assembly 300 of FIG. 14 transmits the engine torque from the first torque converter portion 1302 to the second torque converter portion 1304 successively through (a) the spring damper 302 and (b) the blade damper 301. That is, the engine torque is transmitted first through the first spring damper 302 and then through the blade damper 301. As such, the first damping torque generated by the spring damper 302 of FIG. 14 is applied to the blade damper 301, and the second damping torque generated by the blade damper 301 (which is based on the spring damper output in this example) is applied to the second torque converter portion 1304.

Figure 15:
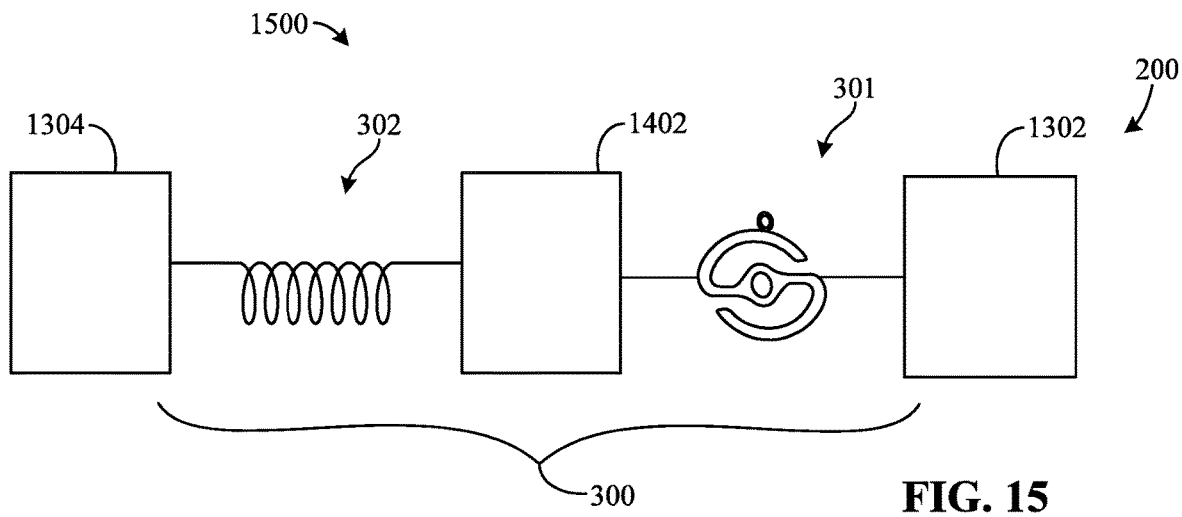

FIG. 15 is another schematic illustration of the torque converter 200 of FIG. 2 and shows a third damper configuration (e.g., a second series configuration) 1500 in accordance with the teachings of this disclosure. In contrast to the illustrated example of FIG. 14, the first torque converter portion 1302 of FIG. 15 is connected to the blade damper 301 to provide the engine torque to the blade damper 301. Further, second torque converter portion 1304 of FIG. 15 is connected to the first spring damper 302 to receive an output from the first spring damper 302. According to the illustrated example of FIG. 15, the blade damper 301 and the first spring damper 302 are connected together in series between the first torque converter portion 1302 and the second torque converter portion 1304 to provide the third damper configuration 1400. In contrast to the illustrated example of FIG. 14, the intermediate portion 1402 of FIG. 15 is configured to transfer torque from the blade damper 301 to the first spring damper 302. In particular, the first spring damper 302 is secondary relative to the blade damper 301 such that an output of the blade damper 301 is applied as an input to the first spring damper 302. Accordingly, when the torque converter 200 receives the engine torque while the first clutch 303 is in the second state thereof, the damper assembly 300 of FIG. 15 transmits the engine torque from the first torque converter portion 1302 to the second torque converter portion 1304 successively through (a) the blade damper 301 and (b) the spring damper 302. That is, the engine torque is transmitted first through the through the blade damper 301 and then through first spring damper 302. Thus, the second damping torque generated by the blade damper 301 of FIG. 15 is applied to the first spring damper 302, and the first damping torque generated by the first spring damper 302 (which is based on the blade damper output in this example) is applied to the second torque converter portion 1304.

Figure 16:
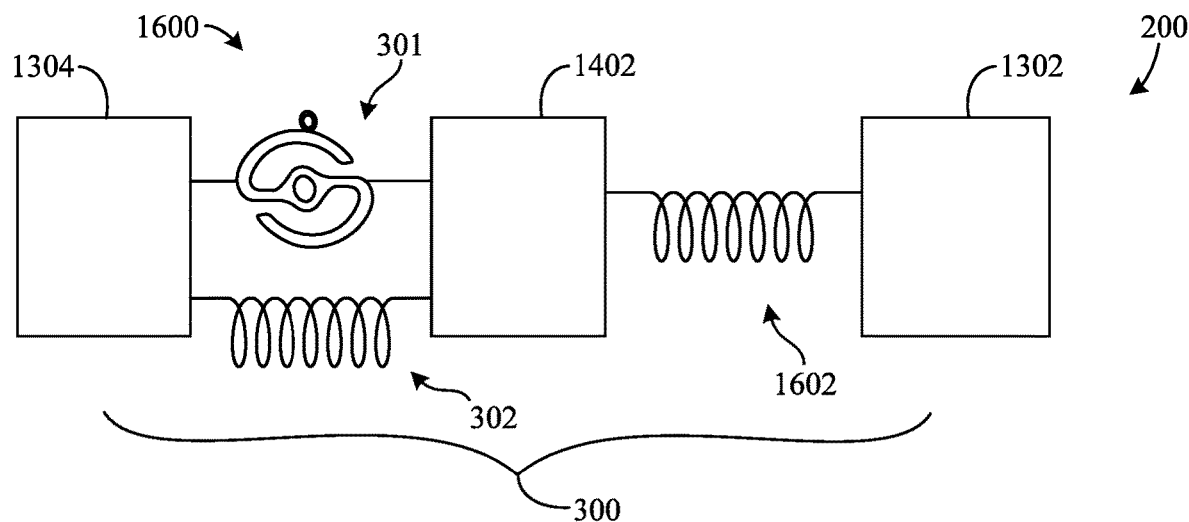

FIG. 16 is another schematic illustration of the torque converter 200 of FIG. 2 and shows a fourth damper configuration (e.g., a first compound configuration) 1600 in accordance with the teachings of this disclosure. According to the illustrated example of FIG. 16, the damper assembly 300 also includes an auxiliary or second spring damper 1602 connected to the blade damper 301 and the first spring damper 302. The first torque converter portion 1302 of FIG. 16 is connected to the second spring damper 1602 to provide the engine torque to the second spring damper 1602. Further, second torque converter portion 1304 of FIG. 16 is connected to both the blade damper 301 and the first spring damper 302 to receive outputs from the respective blade damper 301 and first spring damper 302. Accordingly, the engine torque is transmittable through the blade damper 301, the first spring damper 302, and the second spring damper 1602 from the first torque converter portion 1302 to the second torque converter portion 1304. In particular, the second spring damper 1602 is configured to dampen the torsional vibration together with the blade damper 301 and the first spring damper 302.

According to the illustrated example of FIG. 16, the blade damper 301 and the first spring damper 302 are connected together in parallel between the first torque converter portion 1302 and the intermediate torque converter portion 1402, which are sometimes referred to as a pair of dampers 301, 302 or a pair of parallel dampers 301, 302. Further, the pair of parallel dampers 301, 302 and the second spring damper 1602 are connected together in series between the first torque converter portion 1302 and the second torque converter portion 1304 to provide the fourth damper configuration 1600. In particular, the pair of parallel dampers 301, 302 is secondary relative to the second spring damper 1602 such that an output of the second spring damper 1602 is applied as an input to the pair of parallel dampers 301, 302. Accordingly, when the torque converter 200 receives the engine torque while the first clutch 303 is in the second state thereof, the damper assembly 300 of FIG. 16 transmits the engine torque from the first torque converter portion 1302 to the second torque converter portion 1304 successively through (a) the second spring damper 1602 and (b) the pair of parallel dampers 301, 302. That is, the engine torque is transmitted first through the through the second spring damper 1602 and then simultaneously through the blade damper 301 and the first spring damper 302.

Figure 17:
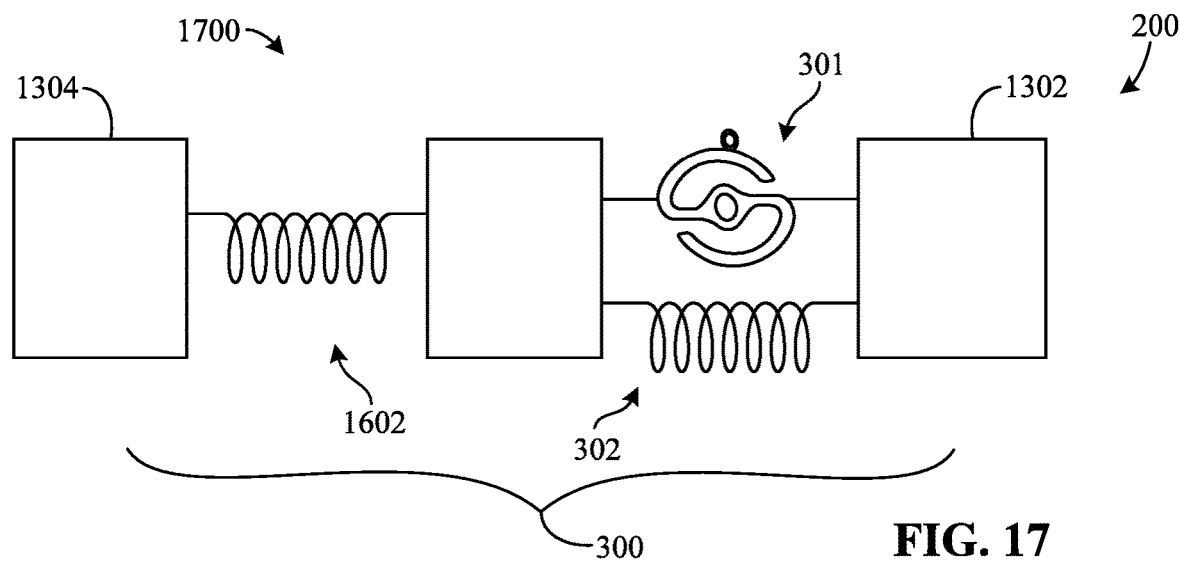

FIG. 17 is another schematic illustration of the torque converter 200 of FIG. 2 and shows a fifth damper configuration (e.g., a second compound configuration) 1700 in accordance with the teachings of this disclosure. In contrast to the illustrated example of FIG. 16, the first torque converter portion 1302 of FIG. 17 is connected to the pair of parallel dampers 301, 302 to provide the engine torque to the pair of parallel dampers 301, 302. Further, second torque converter portion 1304 of FIG. 16 is connected to the second spring damper 1602 to receive an output from the first spring damper 302. According to the illustrated example of FIG. 17, the pair of parallel dampers 301, 302 and the second spring damper 1602 are connected together in series between the first torque converter portion 1302 and the second torque converter portion 1304 to provide the fifth damper configuration 1700. In contrast to the illustrated example of FIG. 16, the second spring damper 1602 of FIG. 17 is secondary relative to the pair of parallel dampers 301, 302 such that an output of the pair of parallel dampers 301, 302 is applied as an input to the second spring damper 1602. Accordingly, when the torque converter 200 receives the engine torque while the first clutch 303 is in the second state thereof, the damper assembly 300 of FIG. 17 transmits the engine torque from the first torque converter portion 1302 to the second torque converter portion 1304 successively through (a) the second spring damper 1602 and (b) the pair of parallel dampers 301, 302. That is, the engine torque is transmitted first through the through the second spring damper 1602 and then simultaneously through the blade damper 301 and the first spring damper 302.

Figure 18:
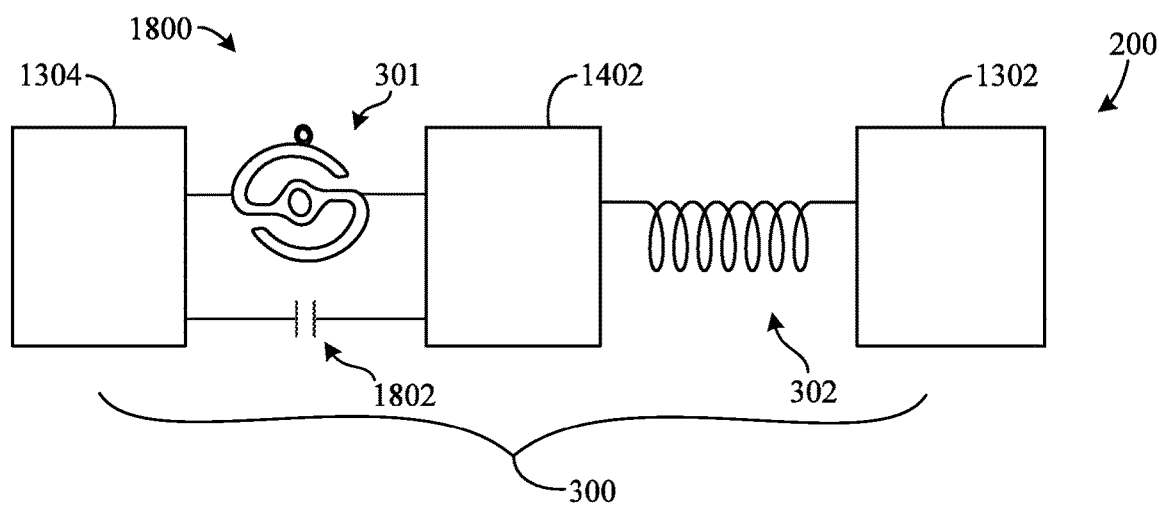

FIG. 18 is another schematic illustration of the torque converter 200 of FIG. 2 and shows a sixth damper configuration (e.g., a third compound configuration) in accordance with the teachings of this disclosure. In contrast to the illustrated examples of FIGS. 16 and 17, the damper assembly 300 does not include the second spring damper 1602. Instead, damper assembly 300 of FIG. 18 includes a stopper 1802 configured to limit rotational or angular deviation associated with the second torque converter portion 1304 and the intermediate torque converter portion 1402. For example, the stopper 1802 is non-relatively rotatably (i.e., fixedly) coupled to one of the second torque converter portion 1304 or the intermediate torque converter portion 1402. When the second torque converter portion 1304 is at a particular position or angle relative to the intermediate torque converter portion 1402, the stopper 1802 engages the other one of the second torque converter portion 1304 or the intermediate torque converter portion 1402 to prevent further rotation associated therewith. In this manner, the stopper 1802 controls a distance across which the first roller 320 can travel across the first blade 318, which limits damping torque generated by the blade damper 301. In other words, the stopper 1802 of FIG. 18 is operatively coupled to the blade damper 301 to limit movement of the first roller 320 relative to the first blade 318. According to the illustrated example of FIG. 18, the blade damper 301 (including the stopper 1802) and the first spring damper 302 are connected together in series to provide the sixth damper configuration 1800, similar to the illustrated example of FIG. 14.

Figure 19:
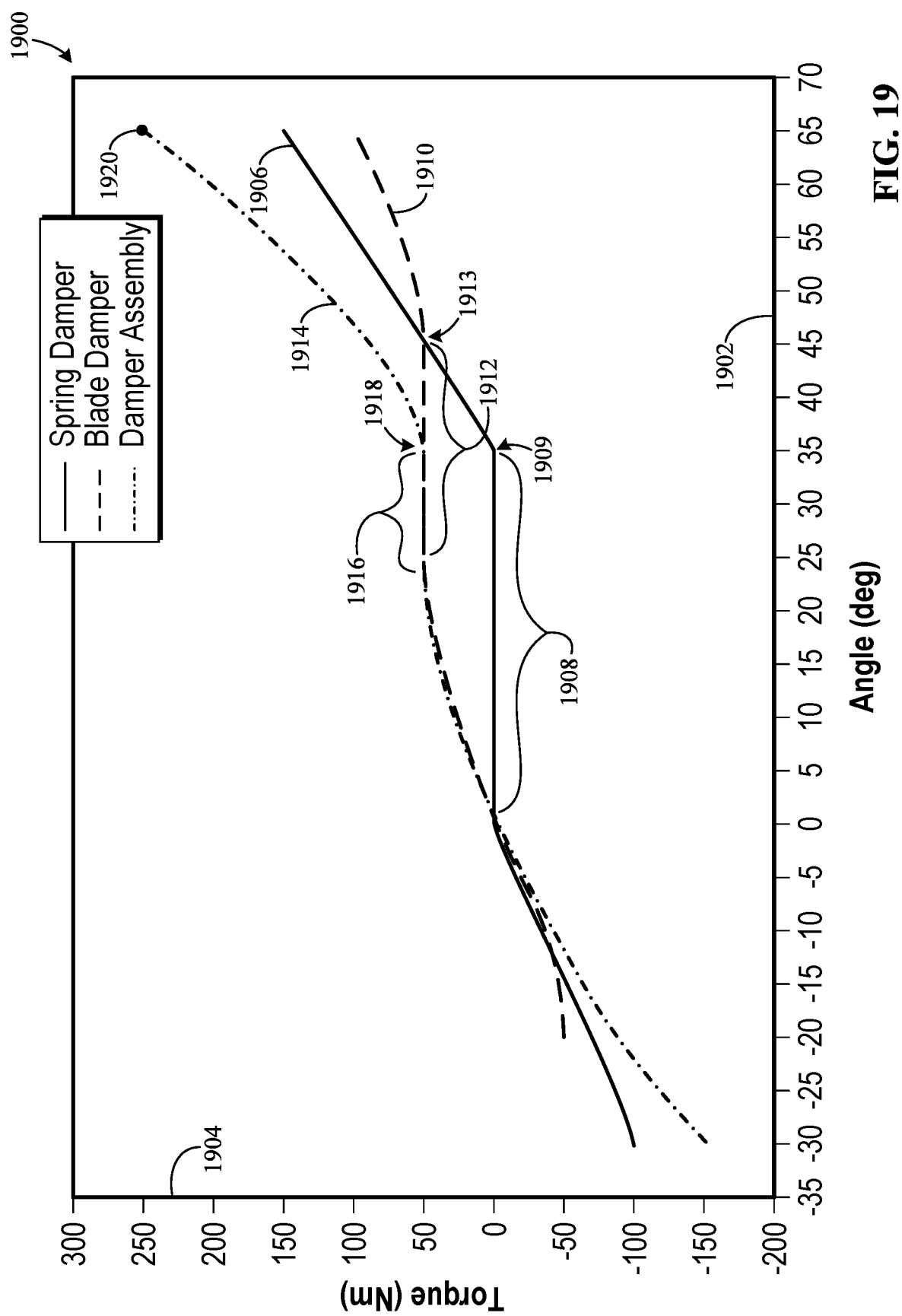
FIG. 19 illustrates a graph showing data associated with operation of the example damper assembly.

FIG. 19 illustrates an example graph 1900 showing data associated with operation of the damper assembly 300. According to the illustrated example of FIG. 19, the graph 1900 includes a first axis (e.g., an x-axis) 1902 that corresponds to a rotational or angular deviation (e.g., in degrees), for example, associated with the cover 202 and the second hub 304. For example, the first axis 1902 of FIG. 19 represents an angle by which the cover 202 rotates relative the second hub 304. The graph 1900 of FIG. 19 also includes a second axis (e.g., a y-axis) 1904, perpendicular to the first axis 1902, that corresponds to a torque (e.g., a damping torque), for example, generated by the damper assembly 300 via the blade damper 301, the first spring damper 302, or a combination thereof.

The graph 1900 of FIG. 19 also includes a first plot (e.g., a torsion curve) 1906 corresponding to operation of only the first spring damper 302, without the blade damper 301, when the torque convert 200 is in the second operating mode thereof (i.e., when the first clutch 303 is in the second state thereof), as represented by the solid line of FIG. 19. In particular, the first plot 1906 represents the first spring damper portion 308 rotating (e.g., resulting from the engine torque) relative to the second spring damper portion 310 to change the state of the first spring 306. As shown in FIG. 19, the first plot 1906 of FIG. 19 includes a first region 1908 associated with a substantially zero (i.e., constant) torque generated by the first spring damper 302. The first region 1908 is partially defined by a first inflection point 1909 of the first plot 1906. To the right (in the orientation of FIG. 19) of the first region 1908 and/or the first inflection point 1909, the torque generated by the first spring damper 302 increases (e.g., linearly) relative to an increase in an angular deviation associated with the first and second spring damper portions 308, 310. Conversely, to the left (in the orientation of FIG. 19) of the first region 1908, the torque generated by the first spring damper 302 decreases (e.g., linearly) relative to a decrease in the angular deviation.

The graph 1900 of FIG. 19 also includes a second plot (e.g., a torsion curve) 1910 corresponding to operation of only the blade damper 301, without the spring damper 302, when the torque converter 200 is in the second operating mode thereof, as represented by the dashed line of FIG. 19. In particular, the second plot 1910 represents the first roller 320 rotating (e.g., resulting from the engine torque) relative to the first blade 318 to change the state of the first blade 318. As shown in FIG. 19, the second plot 1910 of FIG. 19 includes a second region 1912 associated with a positive or non-zero, substantially constant torque generated by the blade damper 301. The second region 1912 is partially defined by a second inflection point 1913 of the second plot 1910. To the right (in the orientation of FIG. 19) of the second region 1912 and/or the second inflection point 1913, the torque generated by the blade damper 301 increases (e.g., non-linearly) relative to an increase in an angular deviation associated with the first roller 320 and the first blade 318. Conversely, to the left (in the orientation of FIG. 19) of the second region 1912, the torque generated by the blade damper 301 decreases (e.g., non-linearly) relative to a decrease in the angular deviation.

The graph 1900 of FIG. 19 also includes a third plot (e.g., a torsion curve) 1914 corresponding to a combined operation of the spring damper 302 and the blade damper 301 (e.g., for the first damper configuration 1300) when the torque converter 200 is in the second operating mode thereof, as represented by the dotted/dashed line of FIG. 19. In other words, the third plot 1914 corresponds to operation of the damper assembly 300 according to one or more disclosed examples. In particular, the third plot 1914 represents (a) the first spring damper portion 308 rotating relative to the second spring damper portion 310 to change the state of the first spring 306 and (b) the first roller 320 rotating relative to the first blade 318 to change the state of the blade 318. As shown in FIG. 19, the third plot 1914 of FIG. 19 includes a third region 1916 associated with a positive or non-zero, substantially constant torque generated by the damper assembly 300. The third region 1916 is partially defined by a third inflection point 1918 of the third plot 1914. To the right (in the orientation of the FIG. 19) of the third region 1916 and/or the third inflection point 1918, the torque generated by the damper assembly 300 increases relative to an increase in an angular deviation associated with the blade damper 301 and the first spring damper 302. Conversely, to the left (in the orientation of FIG. 19) of the third region 1916, the torque generated by the damper assembly 300 decreases (e.g., non-linearly) relative to a decrease in the angular deviation. In particular, the third inflection point 1918 corresponds to a relatively large torque (e.g., about 50 Nm) compared to the first inflection point 1909. Further, the third inflection point 1918 corresponds to a relatively small angle (e.g., about 35 degrees) relative to the second inflection point 1913. As a result, the damper assembly 300 has improved performance characteristic(s) associated therewith compared to the blade damper 301 or the first spring damper 302 by itself. As shown in FIG. 19, the third plot 1914 has a maximum 1920 corresponding to about 250 Nm of torque. Thus, the damper assembly 300 is suitable for high torque vehicle applications in which the engine 102 generates a torque corresponding to about 250 Nm or more.

As used herein, the terms "Including" and "comprising" (and all forms and tenses thereof) are to be open ended terms. Thus, whenever a claim employs any form of "include" or "comprise" (e.g., comprises, includes, comprising, including, has, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended.

It will be appreciated that the systems, apparatus, and methods disclosed in the foregoing description provide numerous advantages. Examples disclosed herein provide a vehicle torque converter that includes a blade damper and a spring damper operatively coupled to the blade damper. Disclosed examples improve damper performance during a high torque lockup operation of the vehicle torque converter. Disclosed examples also reduce costs typically associated with producing blade damper components.

Although certain example apparatus, systems, and methods have been disclosed herein, the scope of coverage of this patent is not limited thereto. Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

What is claimed is:

1. A vehicle torque converter, comprising:
   a housing;
   a hub;
   a clutch including a piston in the housing; and
   a damper assembly operatively interposed between the clutch and the hub, the damper assembly including:
      a blade damper, including:
         a blade; and
         a roller engaging the blade, movement of the roller relative to the blade bending and unbending the blade; and
      a spring damper connected to the blade damper, including:
         a first spring damper portion;
         a second spring damper portion; and
         a spring between the first and second spring damper portions, movement of the first spring damper portion relative to the second spring damper portion compressing and decompressing the spring,
   wherein:
   the blade damper and the spring damper, together, are configured to dampen a torsional vibration received by the housing when the clutch is engaged,
   the blade damper and the spring damper are connected together in parallel,
   the roller is positioned at a first radius relative to an axis of the torque converter to provide a first pitch circle diameter (PCD) associated with the roller, and
   the spring is adjacent the roller and positioned at a second radius relative to the axis proximate the first radius to provide a second PCD associated with the spring.

2. The vehicle torque converter of claim 1, wherein:
   the piston, the roller, and the first spring damper portion are connected together,
   the blade is connected to the hub, and
   the second spring damper portion is connected to a torque converter turbine.

3. The vehicle torque converter of claim 1, wherein the first PCD is substantially equal to the second PCD.

4. The vehicle torque converter of claim 1, wherein the first PCD and the second PCD define a ratio that is between 0.6 and 2.

5. A vehicle torque converter, comprising:
   a housing;
   a hub;
   a clutch including a piston in the housing; and
   a damper assembly operatively interposed between the clutch and the hub, the damper assembly including:
      a blade damper, including:

a blade; and a roller engaging the blade, movement of the roller relative to the blade bending and unbending the blade; and a spring damper connected to the blade damper, including:

a first spring damper portion;

a second spring damper portion; and a spring between the first and second spring damper portions, movement of the first spring damper portion relative to the second spring damper portion compressing and decompressing the spring, wherein:

the blade damper and the spring damper, together, are configured to dampen a torsional vibration received by the housing when the clutch is engaged, the vehicle torque converter further includes a side plate supporting the roller via a bearing interposed between the side plate and the roller, and the side plate corresponds to the first spring damper portion and forms a cavity in which the spring is positioned.

6. The vehicle torque converter of claim 5, wherein the side plate is slidably disposed on a flange of the hub to center to the side plate relative to the housing.

7. The vehicle torque converter of claim 5, further including a retainer plate, separate from the side plate, corresponding to the first spring damper portion and forming a cavity in which the spring is positioned.

8. The vehicle torque converter of claim 7, wherein the retainer plate is rigidly coupled to the side plate.

9. A vehicle torque converter, comprising:

a housing;

a hub;

a clutch including a piston in the housing; and a damper assembly operatively interposed between the clutch and the hub, the damper assembly including:

a blade damper, including:

a blade; and a roller engaging the blade, movement of the roller relative to the blade bending and unbending the blade; and a spring damper connected to the blade damper, including:

a first spring damper portion;

a second spring damper portion; and a spring between the first and second spring damper portions, movement of the first spring damper portion relative to the second spring damper portion compressing and decompressing the spring, wherein:

the blade damper and the spring damper, together, are configured to dampen a torsional vibration received by the housing when the clutch is engaged, the blade damper and the spring damper are connected together in series, and the spring damper is secondary relatively to the blade damper such that an output of the blade damper is applied as an input to the spring damper.

10. The vehicle torque converter of claim 9, further including:

a side plate supporting the roller via a bearing interposed between the side plate and the roller; and a retainer plate, separate from the side plate, corresponding to the first spring damper portion and forming a cavity in which the spring is positioned, wherein:

the retainer plate is movably coupled to the side plate, and the side plate includes a flange configured to slide through a slot of the retainer plate to center the retainer plate relative to the housing.

11. The vehicle torque converter of claim 9, wherein the roller and the spring have respective centers that are vertically aligned to each other.

12. The vehicle torque converter of claim 9, wherein the roller and the spring have respective centers that are offset relative to each other by a value that is about 5 times or less greater than a thickness of the roller on both sides of the blade damper.

13. The vehicle torque converter of claim 9, wherein the piston corresponds to the first spring damper portion and forms a cavity in which the spring is positioned.

14. A vehicle torque converter, comprising:

a housing;

a hub;

a clutch including a piston in the housing; and a damper assembly operatively interposed between the clutch and the hub, the damper assembly including:

a blade damper, including:

a blade; and a roller engaging the blade, movement of the roller relative to the blade bending and unbending the blade; and a spring damper connected to the blade damper, including:

a first spring damper portion;

a second spring damper portion; and a spring between the first and second spring damper portions, movement of the first spring damper portion relative to the second spring damper portion compressing and decompressing the spring, wherein:

the blade damper and the spring damper, together, are configured to dampen a torsional vibration received by the housing when the clutch is engaged, and the blade is rigidly coupled to the hub.

15. A vehicle torque converter, comprising:

a housing;

a hub;

a clutch including a piston in the housing; and a damper assembly operatively interposed between the clutch and the hub, the damper assembly including:

a blade damper, including:

a blade; and a roller engaging the blade, movement of the roller relative to the blade bending and unbending the blade; and a spring damper connected to the blade damper, including:

a first spring damper portion;

a second spring damper portion; and a spring between the first and second spring damper portions, movement of the first spring damper portion relative to the second spring damper portion compressing and decompressing the spring, wherein:

the blade damper and the spring damper, together, are configured to dampen a torsional vibration received by the housing when the clutch is engaged, the spring damper is a first spring damper, the damper assembly includes a second spring damper connected to the first spring damper and the blade damper, and the second spring damper is configured to dampen the torsional vibration together with the first spring damper and the blade damper.

16. A vehicle torque converter, comprising:

a housing;

a hub;

a clutch including a piston in the housing; and a damper assembly operatively interposed between the clutch and the hub, the damper assembly including:

a blade damper, including:
   a blade; and
   a roller engaging the blade, movement of the roller relative to the blade bending and unbending the blade; and
a spring damper connected to the blade damper, including:
   a first spring damper portion;
   a second spring damper portion; and
   a spring between the first and second spring damper portions, movement of the first spring damper portion relative to the second spring damper portion compressing and decompressing the spring, wherein:

the blade damper and the spring damper, together, are configured to dampen a torsional vibration received by the housing when the clutch is engaged, and damper assembly includes a stopper operatively coupled to the damper assembly to limit movement of the roller relative to the blade.

* * * * *